(12) United States Patent
Matsuno

(10) Patent No.: US 9,722,641 B2
(45) Date of Patent: Aug. 1, 2017

(54) SEMICONDUCTOR DEVICE AND RADIO COMMUNICATION DEVICE

(71) Applicant: Renesas Electronics Corporation, Koutou-ku, Tokyo (JP)

(72) Inventor: Noriaki Matsuno, Tokyo (JP)

(73) Assignee: Renesas Electronics Corporation, Tokyo (JP)

( * ) Notice: Subject to any disclaimer, the term of this patent is extended or adjusted under 35 U.S.C. 154(b) by 0 days.

(21) Appl. No.: 15/017,608

(22) Filed: Feb. 6, 2016

(65) Prior Publication Data
US 2016/0248453 A1 Aug. 25, 2016

(30) Foreign Application Priority Data
Feb. 24, 2015 (JP) .................................. 2015-033681

(51) Int. Cl.
*H04B 1/04* (2006.01)

(52) U.S. Cl.
CPC ......... *H04B 1/0458* (2013.01); *H04B 1/0475* (2013.01)

(58) Field of Classification Search
USPC ............ 375/295, 256, 130; 455/78, 77, 280
See application file for complete search history.

(56) References Cited

U.S. PATENT DOCUMENTS

| 5,926,751 A * | 7/1999 | Vlahos ...................... H03D 7/12 455/150.1 |
| 2006/0281418 A1* | 12/2006 | Huang ...................... H04B 1/48 455/78 |
| 2007/0253177 A1* | 11/2007 | Nibe ...................... H05K 1/0231 361/763 |
| 2009/0111390 A1* | 4/2009 | Sutton ...................... H04B 1/40 455/77 |

OTHER PUBLICATIONS

Seol et al., "A 2.4-GHz HBT Power Amplifier Using an On-Chip Transformer as an Output Matching Network", IEEE Microwave Symposium Digest, 2008, pp. 875-878.

* cited by examiner

*Primary Examiner* — Eva Puente
(74) *Attorney, Agent, or Firm* — Shapiro, Gabor and Rosenberger, PLLC

(57) ABSTRACT

A semiconductor device (10) includes a transmitting circuit (12) that converts transmission data into a transmission signal with a specified frequency, an amplifier (13) that amplifies a power of the transmission signal, a matching circuit (14) that converts the transmission signal from a balanced signal to an unbalanced signal, and a filter circuit (14) that restricts a frequency band of the transmission signal. The matching circuit includes a primary inductor and a secondary indictor, the filter circuit includes an inductor for a filter, and the primary inductor, the secondary indictor and the inductor for a filter are wound substantially concentrically on one plane.

14 Claims, 23 Drawing Sheets

SEMICONDUCTOR DEVICE AND RADIO COMMUNICATION DEVICE

CROSS-REFERENCE TO RELATED APPLICATIONS

This application is based upon and claims the benefit of priority from Japanese patent application No. 2015-033681, filed on Feb. 24, 2015, the disclosure of which is incorporated herein in its entirety by reference.

BACKGROUND

The present invention relates to a semiconductor device and a radio communication device and, for example, relates to a semiconductor device and a radio communication device that performs matching and filtering.

There is an increasing demand for computer equipment using radio such as Bluetooth (registered trademark) today. Further, because it is required to build a radio circuit into one chip for incorporation into a wearable device, incorporation of a radio circuit into a semiconductor device such as a microcomputer, SoC (System on a Chip) or the like is increasing.

A radio circuit that is incorporated into a semiconductor device converts a balanced signal into an unbalanced signal using a matching circuit and further performs impedance matching, and then transmits the unbalanced signal from an antenna. For example, a radio circuit that is incorporated into a semiconductor device and that includes a matching circuit is described in "A 2.4-GHz HBT power amplifier using an on-chip transformer as an output matching network", Hoseok Seol; Changkun Park; Dong Ho Lee; Park, Min; Songcheol Hong Microwave Symposium Digest, 2008 IEEE MTT-S International Publication Year: 2008, Page(s): 875-878.

Further, a radio circuit that is incorporated into a semiconductor device includes a filter for suppressing harmonics. For example, a high-efficiency saturated operation power amplifier is used in Bluetooth (registered trademark), Bluetooth low energy (registered trademark) and IEEE802.15.4g. However, because the level of harmonic component contained in the output is high in the saturated operation power amplifier, it is necessary to suppress harmonics so as to conform to laws and specifications before transmission to the space.

For example, in the above-described related art, a study is made about incorporating a matching circuit and a filter into a semiconductor device.

The device according to the related art has a problem that the footprint of the semiconductor device in which the matching circuit and the filter are incorporated increases.

The other problems and novel features of the present invention will become apparent from the description of the specification and the accompanying drawings.

SUMMARY

According to one embodiment, a semiconductor device includes a transmitting circuit that converts transmission data into a transmission signal with a specified frequency, an amplifier that amplifies a power of the transmission signal, a matching circuit that converts the transmission signal from a balanced signal to an unbalanced signal, and a filter circuit that restricts a frequency band of the transmission signal, wherein the matching circuit includes a primary inductor and a secondary indictor, the filter circuit includes an inductor for a filter, and the primary inductor, the secondary indictor and the inductor for a filter are wound substantially concentrically on one plane.

According to the above-described embodiment, it is possible to reduce the footprint of a semiconductor device in which a matching circuit and a filter are incorporated.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Figure 1:
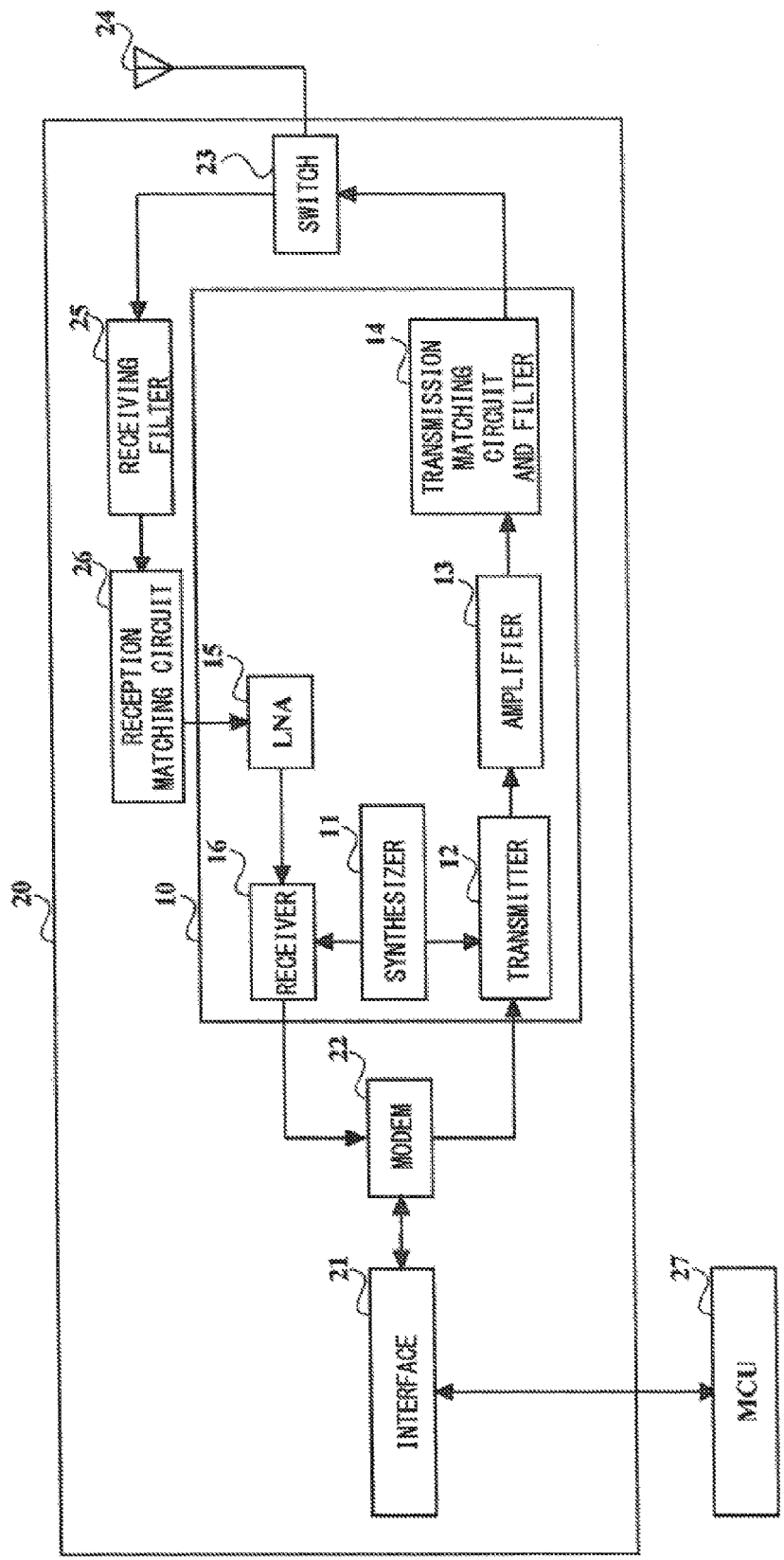
FIG. 1 is a view showing a schematic structure of a semiconductor device according to an embodiment.

Exemplary embodiments of the present invention will be explained hereinbelow with reference to the drawings. The following description and the attached drawings are appropriately shortened and simplified to clarify the explanation. In the drawings, the same elements are denoted by the same reference symbols, and the redundant explanation is omitted according to need.

In the following embodiments, the description will be divided into a plurality of sections or embodiments when necessary for the sake of convenience. However, unless explicitly specified otherwise, those sections or embodiments are by no means unrelated to each other, but are in such a relation that one represents a modification, a detailed or supplementary description, etc. of part or whole of the other. Further, in the following embodiments, when a reference is made to the number etc, (including the number, numeric value, quantity, range, etc.) of elements, except in such cases where it is explicitly specified otherwise or the number is obviously limited to a specific number in principle, the number is not limited to the specific number but may be greater or less than the specific number.

It is needless to mention that, in the following embodiments, their constituent elements (including operation steps) are not necessarily essential, except in such cases where it is explicitly specified otherwise or they are obviously considered to be essential in principle. Likewise, in the following embodiments, when a reference is made to the shape, relative position, etc. of a constituent element or the like, this includes those shapes etc. substantially resembling or similar to that shape etc., except in such cases where it is explicitly specified otherwise or it is obviously considered otherwise in principle. The same applies to the number etc, (including the number, numeric value, quantity, range, etc.) mentioned above.

Overview of Embodiment

FIG. 1 is a view showing a schematic structure of a semiconductor device according to an embodiment. As shown in FIG. 1, a semiconductor device 10 according to an embodiment includes a synthesizer 11, a transmitter 12, an amplifier 13, a transmission matching circuit and filter 14, an LNA 15, and a receiver 16. It is suitable that the semiconductor device 10 is used by being incorporated in a radio communication device 20.

For example, the radio communication device 20 includes the semiconductor device 10, an interface 21, a modem 22, a switch 23, an antenna 24, a receiving filter 25, and a reception matching circuit 26.

The interface 21 adjusts the standards of a signal voltage or the like between the modem 22 and the inside or the outside and mediates the data communication with an MCU (Micro Control Unit) 27. The modem 22 modulates a transmission signal and outputs it to the transmitter 12, and demodulates a received signal from the receiver 16 and outputs it to the interface 21.

The synthesizer 11 includes an oscillator, and generates a signal with a radio frequency and outputs the generated signal to the transmitter 12 and the receiver 16. The transmitter 12 converts a transmission signal into a radio frequency and outputs it to the amplifier 13. The amplifier 13 amplifies the power of the transmission signal and outputs it to the transmission matching circuit and filter 14.

The transmission matching circuit and filter 14 is an integration of a transmission matching circuit (balun) that performs impedance transformation and balanced-to-unbalanced conversion on a transmission signal and a filter that attenuates a signal in a cutoff frequency band into one semiconductor integrated circuit. The transmission matching circuit and filter 14 performs impedance transformation, balanced-to-unbalanced conversion and attenuation of a signal in a cutoff frequency band on a transmission signal. For example, the transmission matching circuit and filter 14 attenuates 3rd harmonics. The transmission matching circuit and filter 14 then outputs the processed transmission signal to the switch 23.

The switch 23 outputs the transmission signal to the antenna 24. Then, the antenna 24 transmits the transmission signal as a radio signal. Further, the antenna 24 outputs a received radio signal as a received signal to the switch 23. The switch 23 outputs the received signal to the receiving filter 25.

The receiving filter 25 attenuates a signal in a cutoff frequency band on the received signal and outputs it to the reception matching circuit 26. The reception matching circuit 26 performs impedance transformation and balanced-to-unbalanced conversion on the received signal. The reception matching circuit 26 then outputs the processed received signal to the LNA 15.

The LNA 15 is a low noise amplifier, and amplifies a received signal and outputs it to the receiver 16. The receiver 16 converts the received signal from a radio frequency to a baseband and outputs it to the modem 22.

As described above, the semiconductor device according to this embodiment includes a transmission matching circuit and a filter as one integrated circuit.

Figure 2:
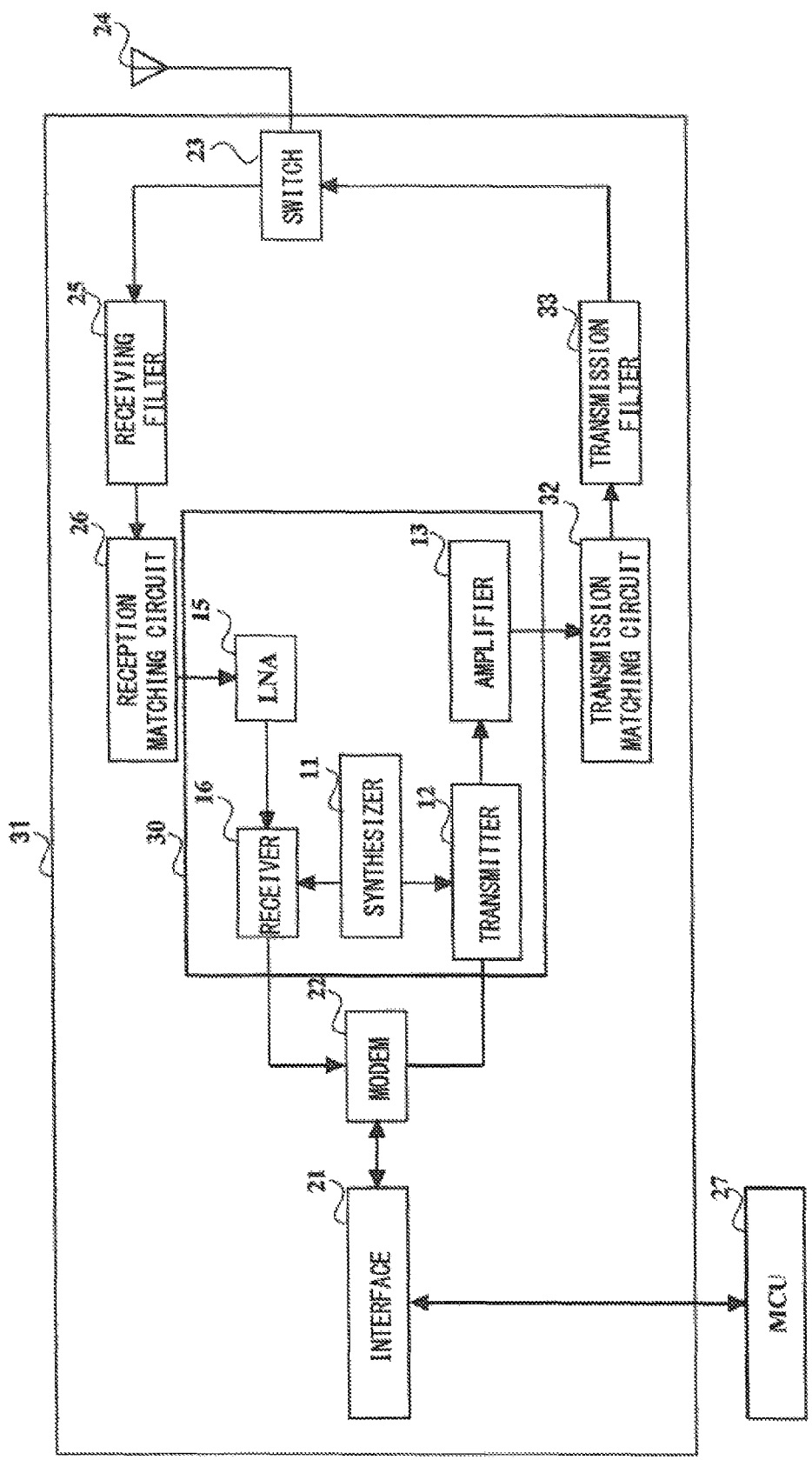
FIG. 2 is a view showing a schematic structure of a typical semiconductor device used for a radio communication device.

FIG. 2 is a view showing a schematic structure of a typical semiconductor device used for a radio communication device. In FIG. 2, the same elements as in FIG. 1 are denoted by the same reference numerals and not redundantly described.

In FIG. 2, a semiconductor device 30 is different from the semiconductor device 10 in FIG. 1 in that it does not include the transmission matching circuit and filter 14. A radio communication device 31 includes a transmission matching circuit 32 and a transmission filter 33 separately from the semiconductor device 30.

The semiconductor device 10 according to this embodiment includes the transmission matching circuit and filter 14 inside the semiconductor, and the radio communication device 20 does not need to prepare a transmission matching circuit and a filter separately.

Figure 3:
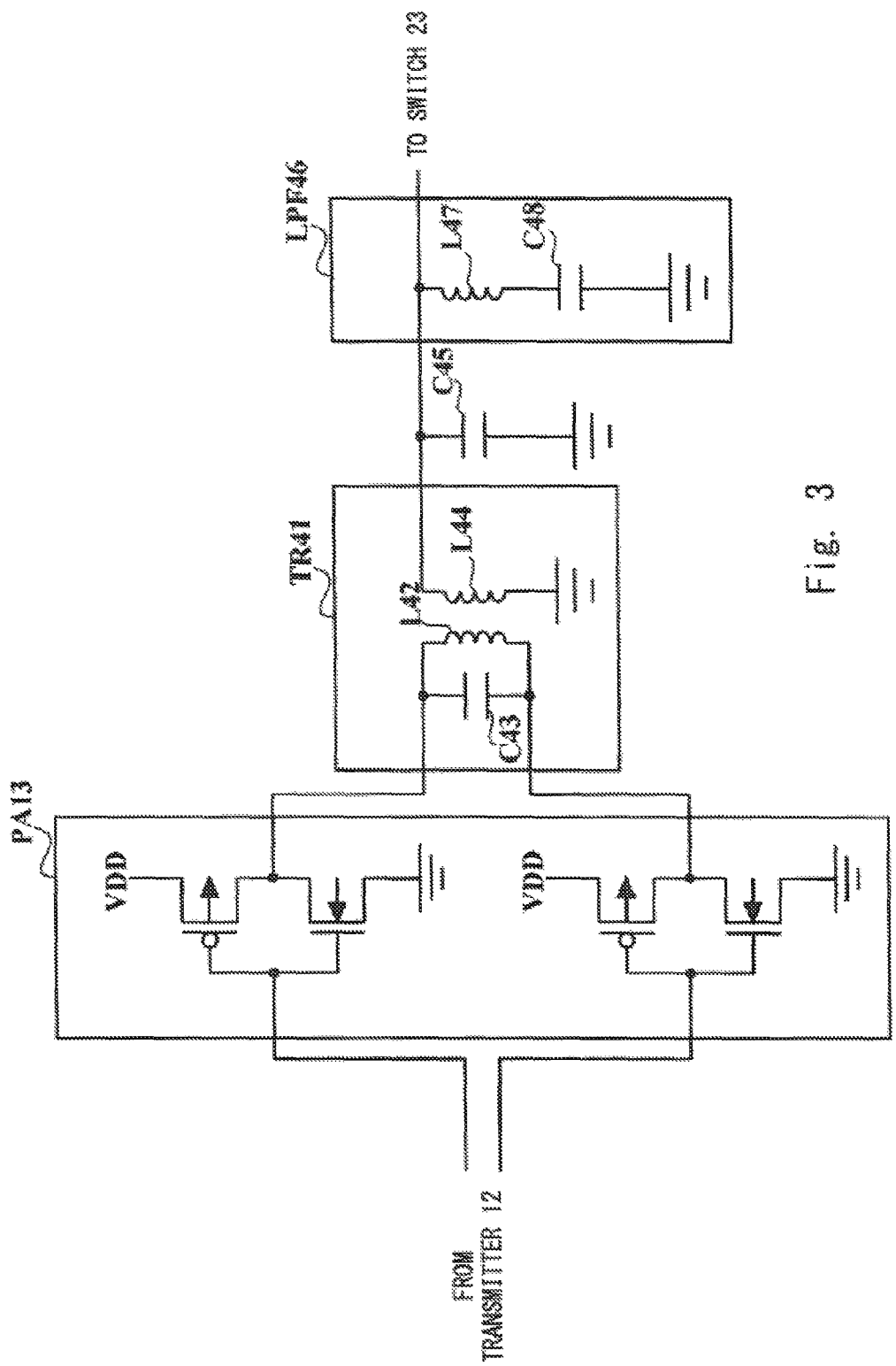
FIG. 3 is a view showing a schematic structure of a semiconductor device according to an embodiment.

The semiconductor device according to this embodiment as a circuit is described next. FIG. 3 is a circuit diagram showing a schematic structure of a transmission part of the radio communication device. FIG. 3 shows a part including an amplifier, a transmission matching circuit and a filter among the circuit structure of the radio communication device.

As shown in FIG. 3, an amplifier PA13 is a differential power amplifier composed of a combination of FET (Field effect transistor). The amplifier PA13 has an input terminal connected to the transmitter 12 and an output terminal connected to a balanced terminal of a transmission matching circuit TR41.

The transmission matching circuit TR41 is composed of an inductor L42 and a capacitor C43 on the balanced side and an inductor L44 on the unbalanced side. A capacitor C45 on the unbalanced side may be placed outside or inside the transmission matching circuit TR41. In the transmission matching circuit TR41, two terminals on the balanced side are connected to the output of the amplifier PA13, one terminal on the unbalanced side is grounded, and the other terminal on the unbalanced side is an output.

A filter LPF46 is composed of an inductor L47 and a capacitor C48. One end of the inductor L47 is connected to the output of the transmission matching circuit TR41, and the other end of the inductor L47 is connected to one end of the capacitor C48. The other end of the capacitor C48 is grounded.

Figure 4:
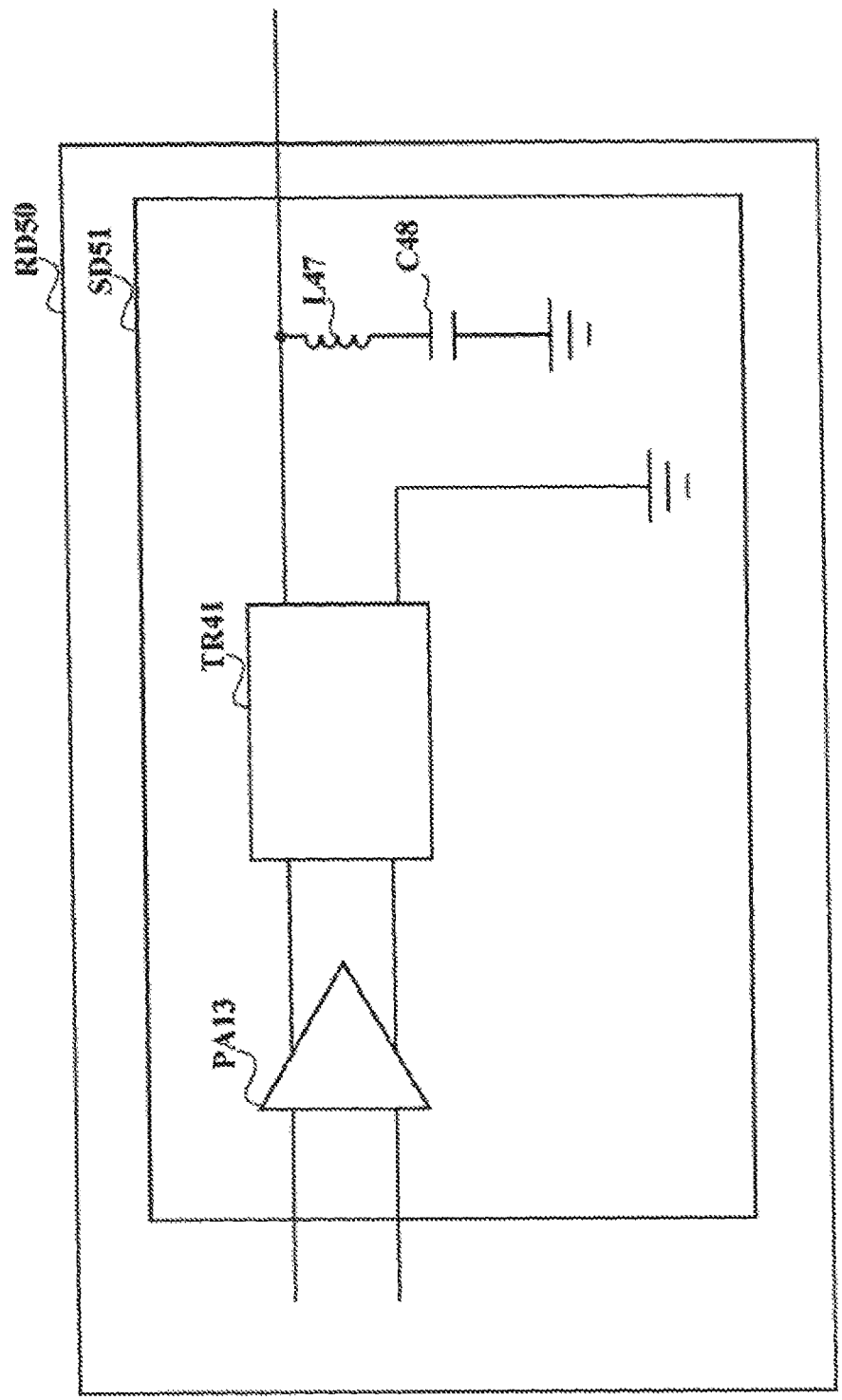
FIG. 4 is a view showing a schematic structure of a semiconductor device according to an embodiment.

The inventor of the present invention has devised the idea of incorporating the transmission matching circuit TR41 and the filter LPF46 into a semiconductor device. FIG. 4 is a view showing a schematic structure of a semiconductor device according to an embodiment. As shown in FIG. 4, a semiconductor device SD51 inside a radio communication device RD51 includes the amplifier PA13, the transmission matching circuit TR41, the Inductor L47, and the capacitor C48.

Figure 5:
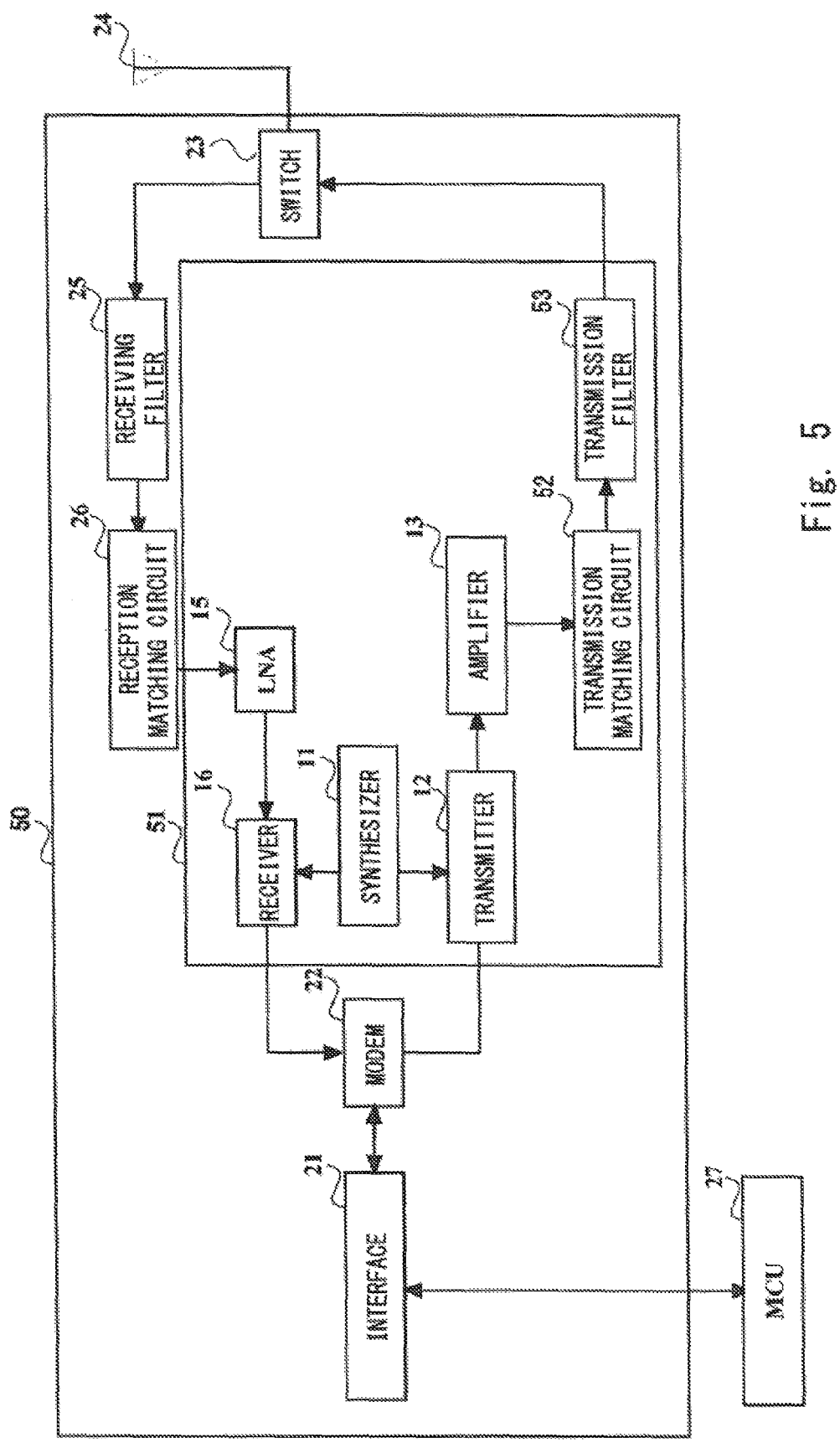
FIG. 5 is a view showing a schematic structure of a semiconductor device according to an embodiment.

FIG. 5 shows a block diagram of the semiconductor device SD51. FIG. 5 is a view showing a schematic structure of the semiconductor device according to the embodiment. In FIG. 5, the same elements as in FIG. 1 are denoted by the same reference numerals and not redundantly described.

A semiconductor device SI shown in FIG. 5 includes a synthesizer 11, a transmitter 12, an amplifier 13, an LNA 15, a receiver 16, a transmission matching circuit 52, and a filter 53. A radio communication device 50 includes the semiconductor device 51, an interface 21, a modem 22, a switch 23, an antenna 24, a receiving filter 25, and a reception matching circuit 26.

As shown in FIG. 5, the inventor of the present invention has first devised the idea of incorporating the transmission matching circuit 52 and the filter 53 into the semiconductor device 51 and further devised the idea of integrating the transmission matching circuit 52 and the filter 53 together in the semiconductor device 51.

Specifically, as shown in FIG. 3, one end of the inductor L44 on the unbalanced side of the transmission matching circuit TR41 and one end of the inductor L47 of the filter LPF46 are connected to each other, and the connection point serves as the output on the unbalanced side. Thus, in the case where the transmission matching circuit TR41 and the filter LPF46 are integrated together, a circuit with total five-terminals, which are the two terminals on the balanced side, one terminal where the inductor L44 on the unbalanced side and the inductor L47 of the filter LPF46 are connected, the other one terminal of the inductor L44 on the unbalanced side, and the other one terminal of the inductor L47 of the filter LPF46, is constructed.

Figure 6:
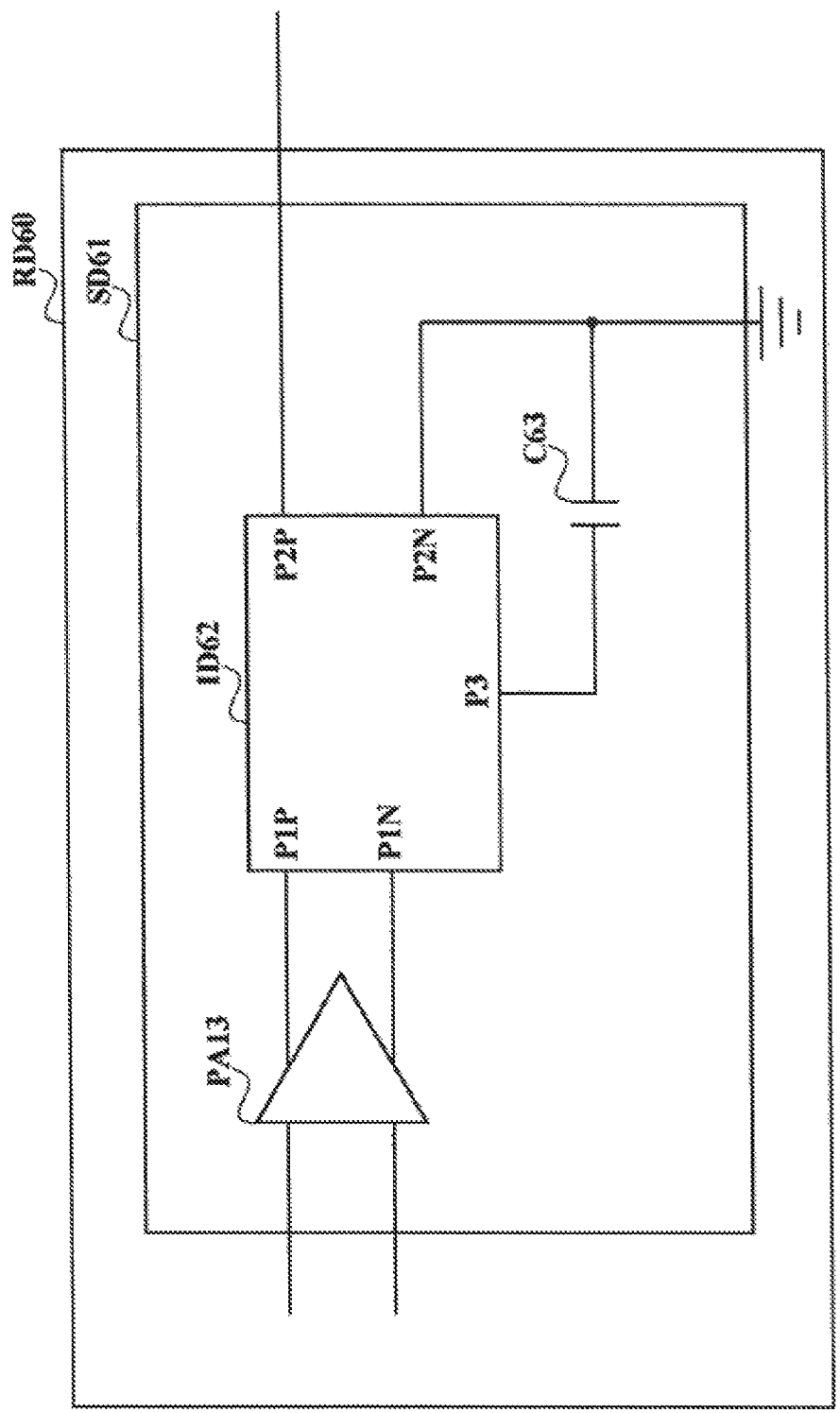
FIG. 6 is a view showing a schematic structure of a semiconductor device according to an embodiment.

FIG. 6 is a view showing a schematic structure of a semiconductor device according to an embodiment. In FIG. 6, a semiconductor device SD61 inside a radio communication device RD60 includes the amplifier PA13, a transmission matching circuit and inductor ID62, and a capacitor C63. All of those elements are formed on a semiconductor substrate.

The transmission matching circuit and inductor ID62 has two terminals P1P and P1N on the balanced side of the matching circuit, a terminal P2P as a connection point between the inductor on the unbalanced side of the matching circuit and the inductor of the filter, the other terminal P2N of the inductor on the unbalanced side of the matching circuit, and the other terminal P3 of the inductor of the filter. Thus, the transmission matching circuit and inductor ID62 is a passive circuit with five terminals.

The terminal P2P serves as an output terminal, and the terminal P2N is grounded. The terminal P3 is connected to one end of the capacitor C63. The other end of the capacitor C63 is grounded. By such connections, a serial connection circuit of the inductor ID62 and the capacitor C63 is constructed.

The terminals P1P and P1N are respectively connected to the outputs of the amplifier PA13. The terminal P2N is grounded and is further connected to the terminal P3 through the capacitor to form a filter. The terminal P2P functions as an output terminal on the unbalanced side.

Figure 7:
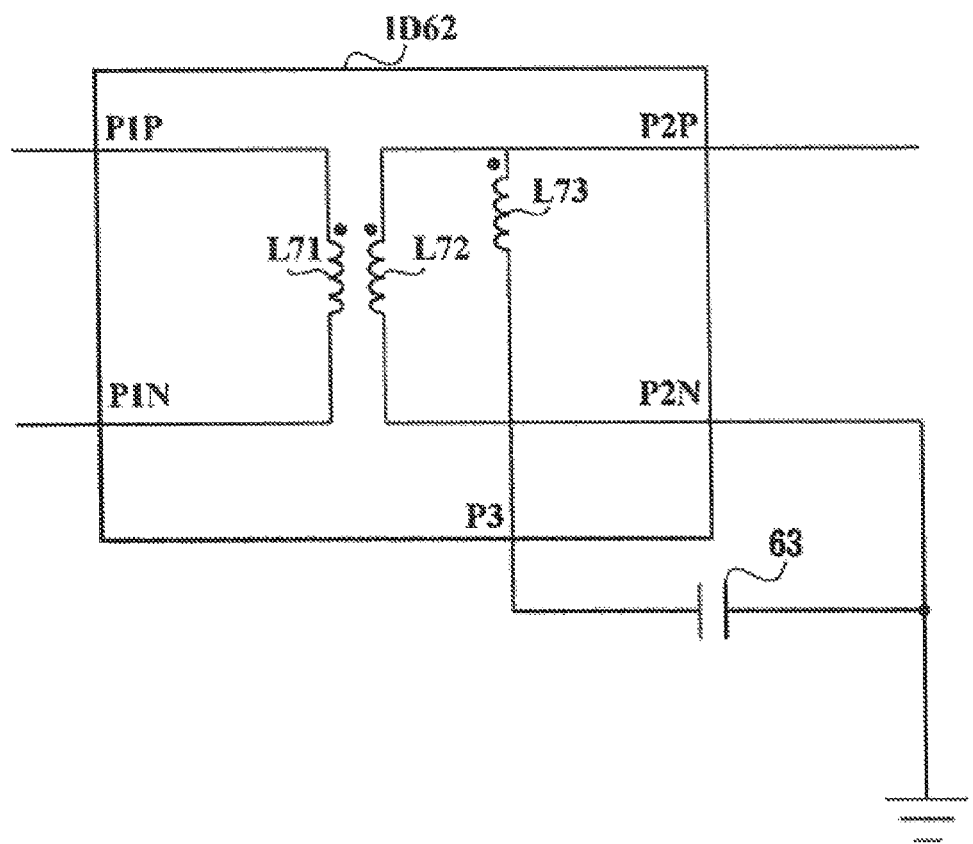
FIG. 7 is a circuit diagram showing a schematic structure of a semiconductor device according to an embodiment.

FIG. 7 shows an internal circuit of the transmission matching circuit and inductor ID62 of FIG. 6. FIG. 7 is a circuit diagram showing a schematic structure of a semiconductor device according to an embodiment.

As shown in FIG. 7, the transmission matching circuit and inductor ID62 includes an inductor L71 on the balanced side of the transmission matching circuit, an inductor L72 on the unbalanced side, and an inductor L73 of the filter, which are coupled together by mutual inductance. Specifically, the inductor L71 on the balanced side of the transmission matching circuit and the inductor L72 on the unbalanced side of the transmission matching circuit are coupled by mutual inductance, the inductor L71 on the balanced side and the inductor L73 of the filter are coupled by mutual inductance, and the inductor L72 on the unbalanced side and the inductor L73 of the filter are coupled by mutual inductance.

The effects of the structure where the inductors of the transmission matching circuit and the inductor of the filter are coupled together by mutual inductance will be made clear in the description of embodiments below.

Embodiment 1

Figure 8:
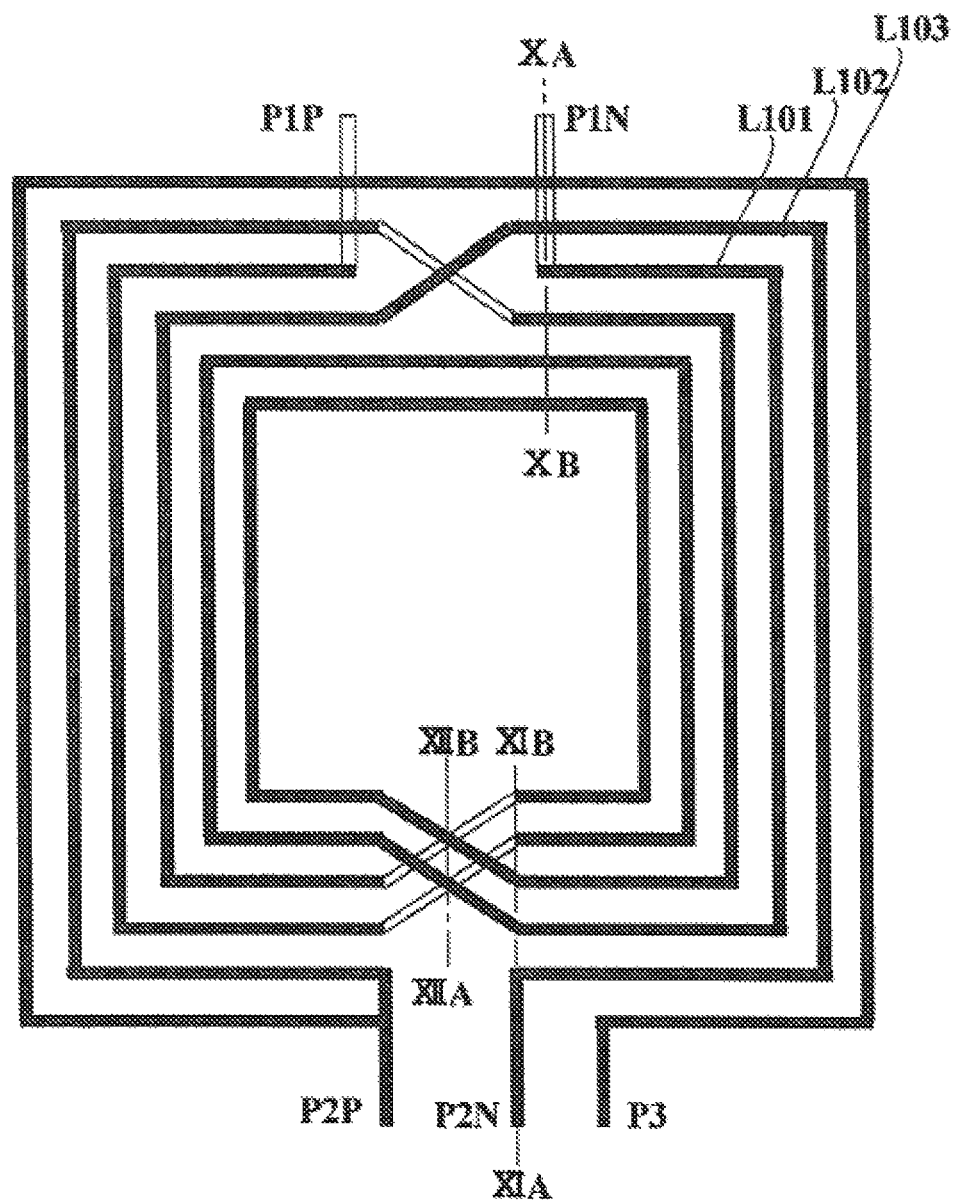
FIG. 8 is a view showing a structure of a semiconductor device according to a first embodiment.

A first embodiment is described hereinafter with reference to the drawings. In the first embodiment, an example in which a matching circuit functions as a balun that includes balanced-to-unbalanced conversion is described. Specifically, a primary inductor of the matching circuit serves as an inductor on the balanced side, and a secondary inductor of the matching circuit serves as an inductor on the unbalanced side. FIG. 8 is a view showing a structure of a semiconductor device according to the first embodiment. In FIG. 8, the solid lines indicate wires of a wiring layer, and hollow lines indicate wires of another wiring layer. As shown in FIG. 8, a semiconductor device SD100 has an inductor L101, an inductor L102 and an inductor L103 on a plane of a semiconductor substrate.

The inductor L101 is an Inductor on the balanced side of the matching circuit and connects P1P and P1N as terminals. The Inductor L102 is an inductor on the unbalanced side of the matching circuit and connects P2P and P2N as terminals.

The inductor L103 is an inductor that forms a filter and connects P2P and P3 as terminals. Thus, one ends of the inductor L102 and the inductor L103 are connected to each other, and they have P2P as an output terminal.

In FIG. 8, the inductor L101 has two turns, the inductor L102 has three turns, and the inductor L103 has one turn. However, the number of turns of each inductor is determined by inductance to be set, and it is not limited to the number of turns shown in FIG. 8.

Further, the inductor L102 and the inductor L103 are wound in the same circumferential direction when viewed from the terminal P2P, that is, wound right handed when FIG. 8 is viewed from the front. It is preferred that each inductor is formed on the thickest layer of the multi-layer wiring layer. Only at the intersection of wires, one wire is formed using another wiring layer.

As shown in FIG. 8, the inductor L101, the inductor L102 and the inductor L103 form a substantial loop and are arranged substantially concentrically on a plane with no contact with one another. In other words, the three inductors are arranged so that their centers are inside the innermost inductor.

Those inductors are arranged substantially concentrically: the inductor L102, the inductor L101, the inductor L102, the inductor L101, the inductor L102 and the inductor L103, sequentially from the inside.

Figure 10:
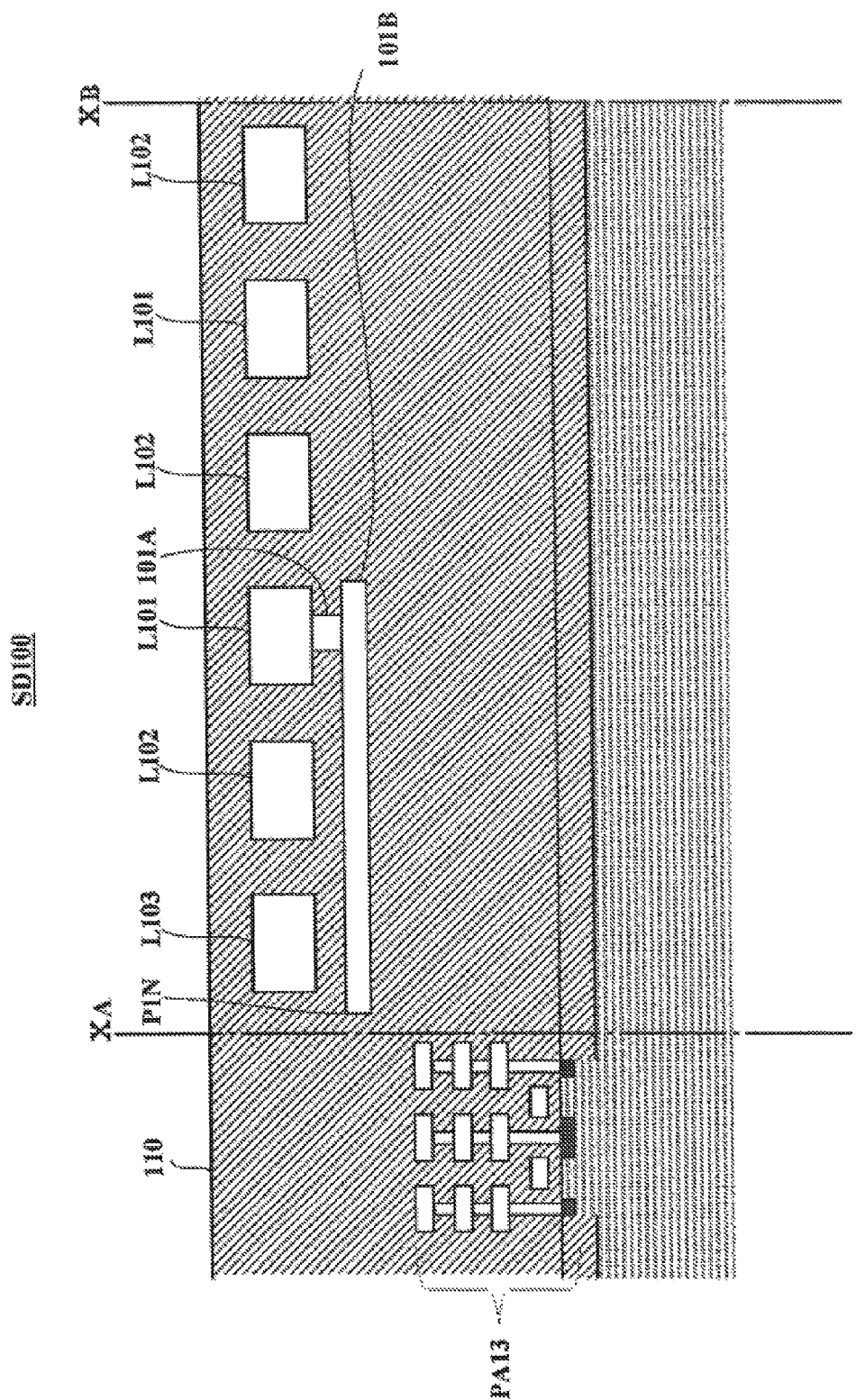
FIG. 10 is a sectional view showing a structure of the semiconductor device according to the first embodiment.
Figure 11:
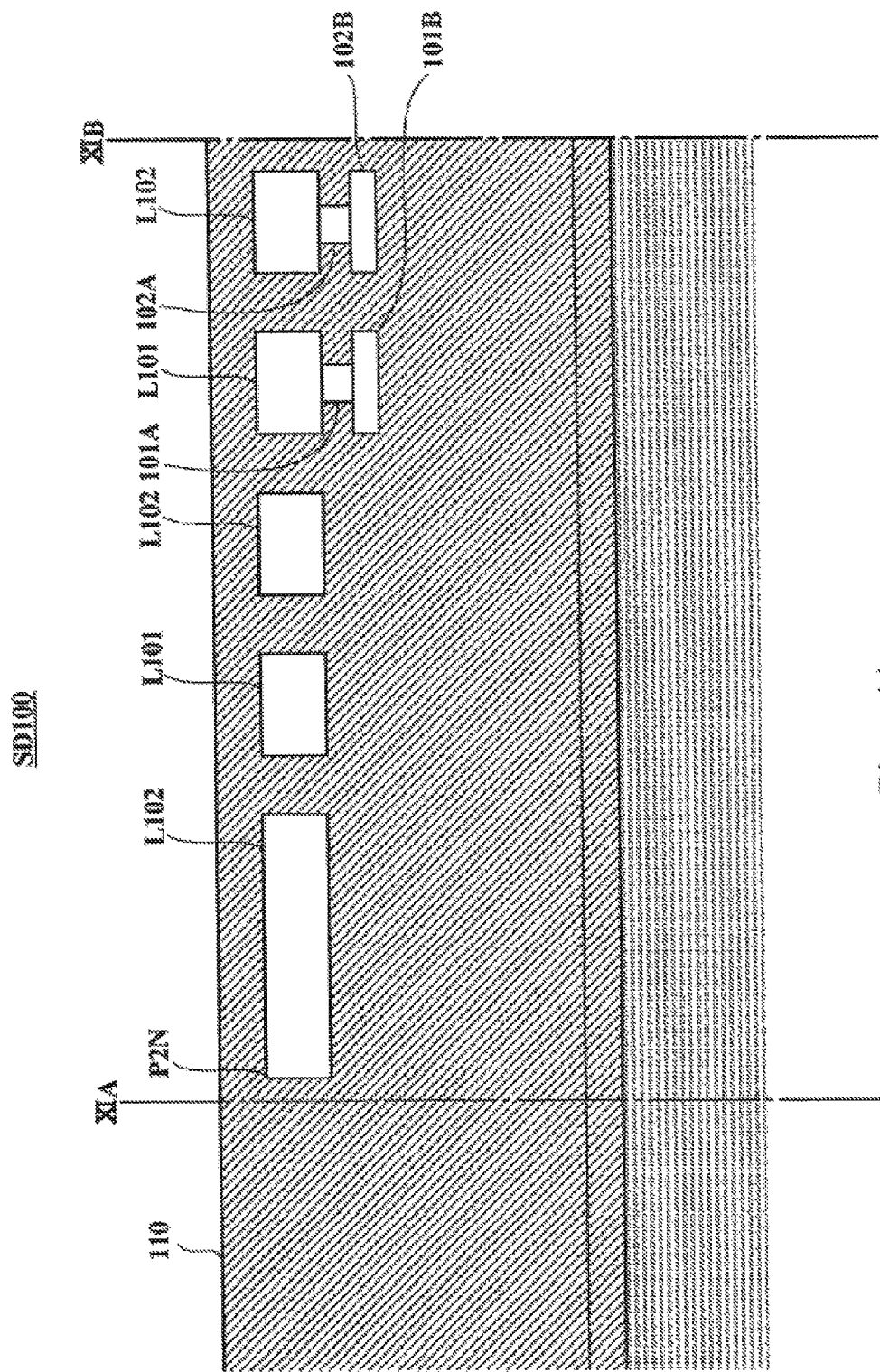
FIG. 11 is a sectional view showing a structure of the semiconductor device according to the first embodiment.
Figure 12:
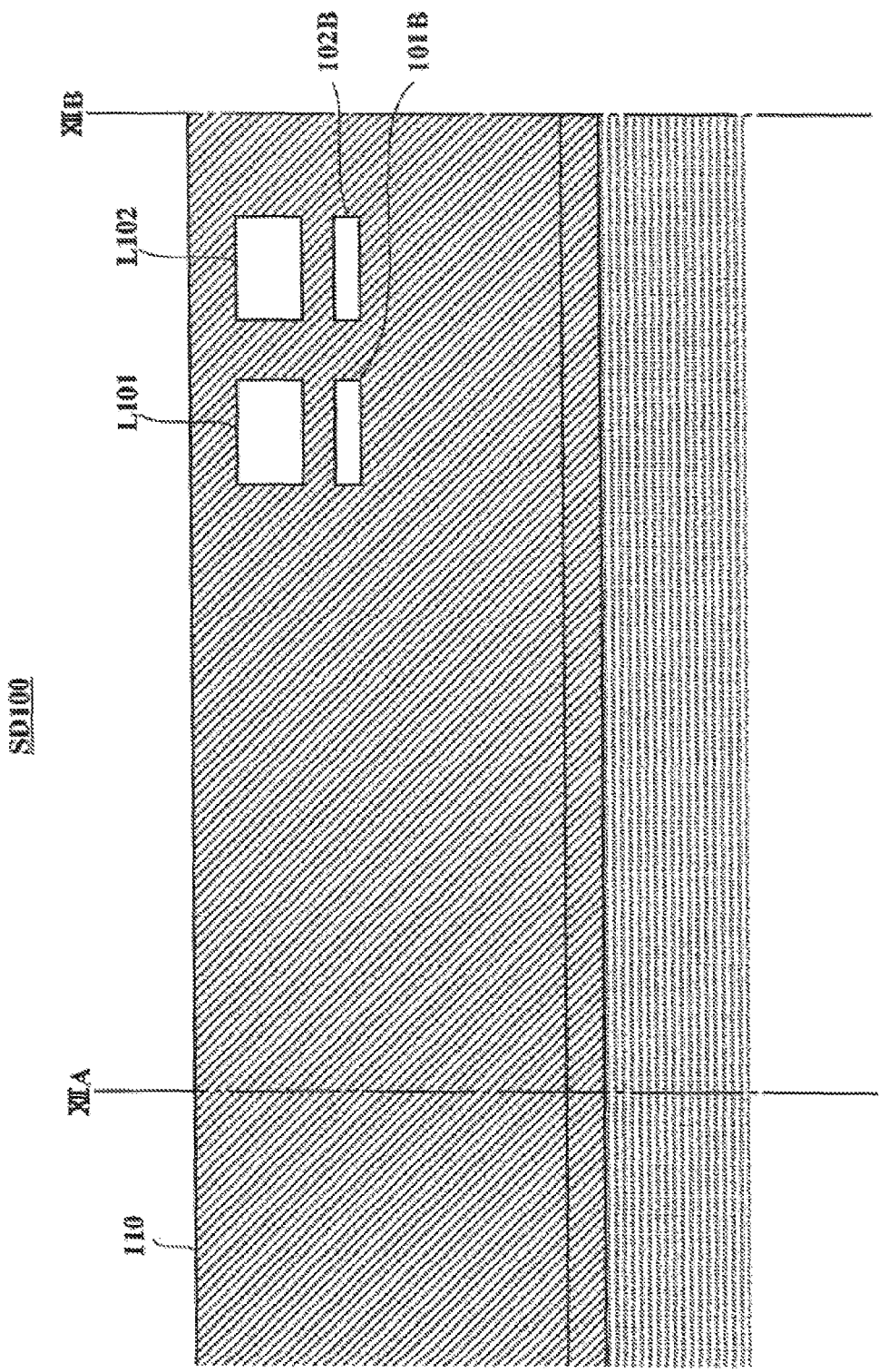
FIG. 12 is a sectional view showing a structure of the semiconductor device according to the first embodiment.

The structure in the layering direction of the semiconductor device SD100 is described next. FIGS. 10 to 12 are sectional views showing the structure of the semiconductor device according to the first embodiment.

FIG. 10 is a sectional view showing the cross-section along line XA-XB in FIG. 8. In FIG. 10, the inductors L101 to L103 are formed in the same layer. The inductor L101 is connected to the terminal P1N through a via 101A and a wire 101B of another wiring layer.

In this manner, the inductors are formed in the same layer and go through another wiring layer at an intersection of wires, thereby forming the semiconductor device SD100.

It is preferred that the inductors L101 to L103 are formed using the thickest layer of the multi-layer wiring. Further, the intersection of wires can be formed using another wiring layer. Furthermore, as shown in FIG. 10, it is preferred that the inductors L101 to L103 are formed in a layer different from a layer of the amplifier PA13.

The inductors go through another wiring layer at an intersection of inductors as well, thereby forming the semiconductor device SD100. FIG. 11 is a sectional view showing the cross-section along line XIA-XIB in FIG. 8. In FIG. 11, the intersecting wires of the inductors L101 and L102 respectively go through vias 101A and 102A and connect to wires 101B and 102B in another wiring layer.

FIG. 12 is a sectional view showing the cross-section along line XIIA-XIIB in FIG. 8. As shown in FIG. 12, the inductors L101 and L102 are formed in a different layer from the wires 101B and 102B, and thus the inductors L101 and L102 can intersect with each other without coming into contact with the wires 101B and 102B.

As described with reference to FIGS. 8 to 12, the inductor L101 and the inductor L102 are wound with their wires alternately to each other, so that the coupling constant of the inductor L101 and the inductor L102 is large. On the other hand, because the inductor L103 is wound on the circumference of the inductor L101 and the inductor L102, the coupling constant of the inductor L103 and the inductor L101 and the coupling constant of the inductor L103 and the inductor L102 are smaller than the coupling constant of the inductor L101 and the inductor L102.

In this manner, in the semiconductor device SD100, the coupling constant of the inductors L101 and L102 that form the matching circuit is larger than the coupling constant of the inductor L103 that forms the filter and the inductors L101 and L102 that form the matching circuit, thereby reducing the effects of the inductor L103 that forms the filter on the operation of the matching circuit.

Further, because the inductor L103 that forms the filter and the inductors L101 and L102 that form the matching circuit are coupled by mutual inductance in the semiconductor device SD100, the same inductance can be achieved with smaller self inductance compared with the case where an inductor of a filter is placed outside a semiconductor device separately from a matching circuit. Specifically, assuming that a capacitance used for a resonant circuit is constant, a desired resonant circuit can be implemented using an inductor with smaller self inductance. This is advantageous in increasing a Q value of the resonant circuit.

The self inductance is generally proportional to the square of the number of turns of an inductor, and therefore the number of turns of an inductor can be reduced by reducing the self inductance of the inductor. It is thereby possible to further reduce the footprint of the inductor.

The self inductance and the mutual inductance of each inductor are determined by the wire length, the number of turns, the cross-sectional area, the coupling constant and the like of the inductor, and therefore the optimum values can be obtained by calculations and simulations.

Figure 9:
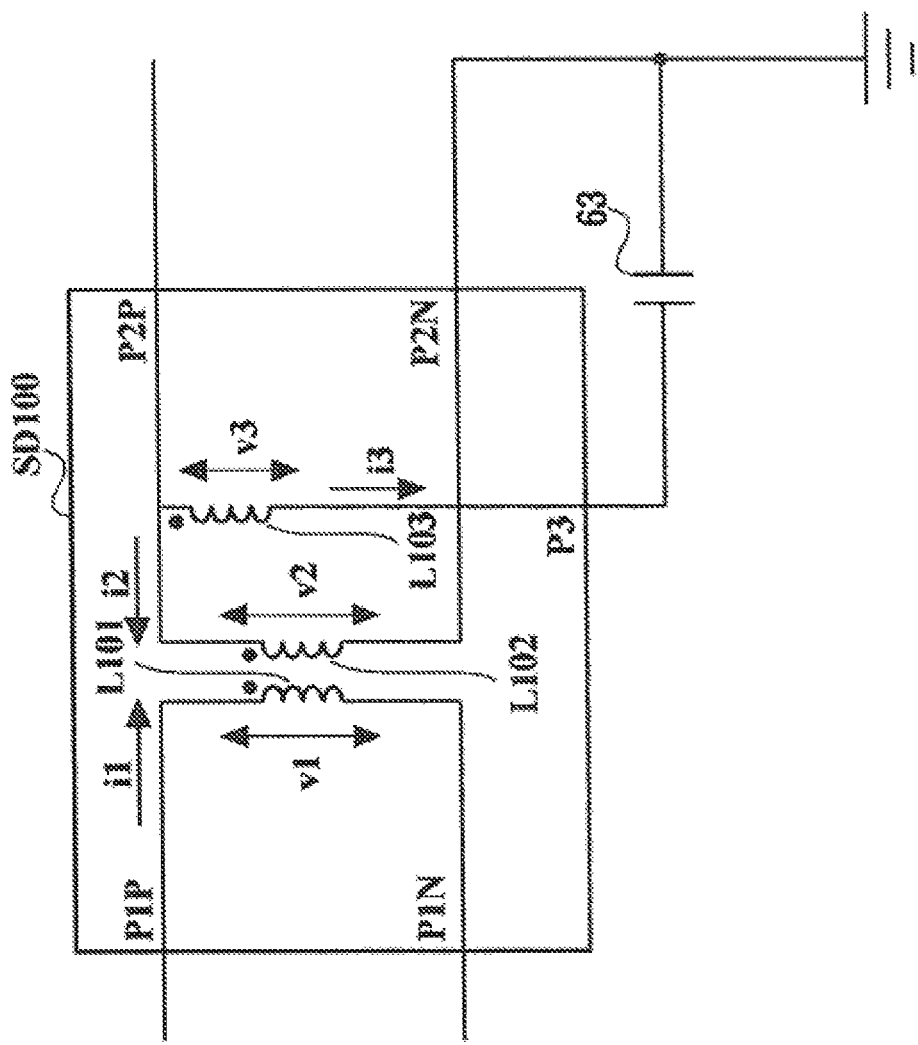
FIG. 9 is a circuit diagram showing a schematic structure of the semiconductor device according to the first embodiment.

The coupling constant of mutual reactance of a semiconductor device is described in further detail below. FIG. 9 is a circuit diagram showing a schematic structure of the semiconductor device according to the first, embodiment. In FIG. 9, a voltage that is applied to the inductor L101 is v1, a current that flows to the inductor L101 is i1, and the self inductance of the inductor L101 is L1. Likewise, a voltage that is applied to the inductor L102 is v2, a current that flows to the inductor L102 is i2, and the self inductance of the inductor L102 is L2. Further, a voltage that is applied to the inductor L103 is v3, a current that flows to the inductor L103 is i3, and the self inductance of the inductor L103 is L3.

Further, the mutual inductance of the inductor L101 and the inductor L102 is M12, the mutual inductance of the inductor L101 and the inductor L103 is MPA13, and the mutual inductance of the inductor L102 and the inductor L103 is M23. Note that the semiconductor device SD100 is configured to satisfy M11>0, MPA13>0 and M23>0.

The voltage v2 that is generated at the inductor L102 is defined by the following Equation (1).

$$v2 = j\omega L2 i2 + j\omega M12 i1 + j\omega M23 i3$$

where j is an imaginary unit, and w is each frequency of a signal to be processed.

At a 3rd harmonic frequency, a serial connection circuit of the inductor L103 and the capacitor C63 is designed so that P2P and P2N are short-circuited. Accordingly, v2 is represented by the following Equation (2).

$$v2 = 0$$

At this time, because all of the current i2 that flows through the inductor L102 flows into the inductor L103, the relationship of the following Equation (3) is obtained in consideration of the polarity.

$$i2 = -i3$$

By substitution of Equations (2) and (3) into Equation (1) and rearrangement, the following Equation (A) is obtained.

$$i1 = [(L2 - M23)/M12]i3$$

For v3, the following Equation (5) is established.

$$v3 = j\omega L3 i3 + j\omega M13 i1 + j\omega M23 i2$$

Because the sum of v3 and a voltage between both terminals of the capacitor C63 is zero at a 3rd harmonic frequency, the following Equation (6) is obtained.

$$v3 + i3/j\omega C = 0$$

where C is a capacitance of the capacitor C63.

From the above-described Equations (3), (4), (5) and (6), the following Equation (7) is obtained.

$$L3 - M23 + (L2 - M23)M13/M12 = 1/\omega^2 C$$

When the coupling constant of the inductors L101 and L102 is k12, the coupling constant of the inductors L102 and L103 is k23, and the coupling constant of the inductors L101 and L103 is kPA13, Equation (7) is transformed into the following Equation (8).

$$L3(1-k13k23/k12)+(L2L3)^{0.5}(k13/k12-k23)=1/\omega^2 C$$

The left side of Equation (8) corresponds to the inductance of the inductor L47 in the equivalent circuit of FIG. 4. By dividing the left side of Equation (8) by L3, the following Equation (9) is obtained.

$$1-k13k23/k12+(L2/L3)^{0.5}(k13/k12-k23)$$

When the value of Equation (9) is larger than 1, it means that the inductance of the inductor L47 in the equivalent circuit of FIG. 4 is larger than the self inductance L3 of the inductor L103.

For simplification, consider the case where kPA13=k23=k and k<k12 are satisfied. This condition is to increase the coupling between the inductor L101 and the inductor L102, which is important as the matching circuit, and reduce the coupling related to the inductor L103, which is added for a 3rd harmonic filter. This is the condition that is already achieved in the structure shown in FIG. 8. In this case, Equation (9) is simplified into the following Equation (10).

$$1-k^2/k12+(L2/L3)^{0.5}k(/k12-1)$$

Figure 13:
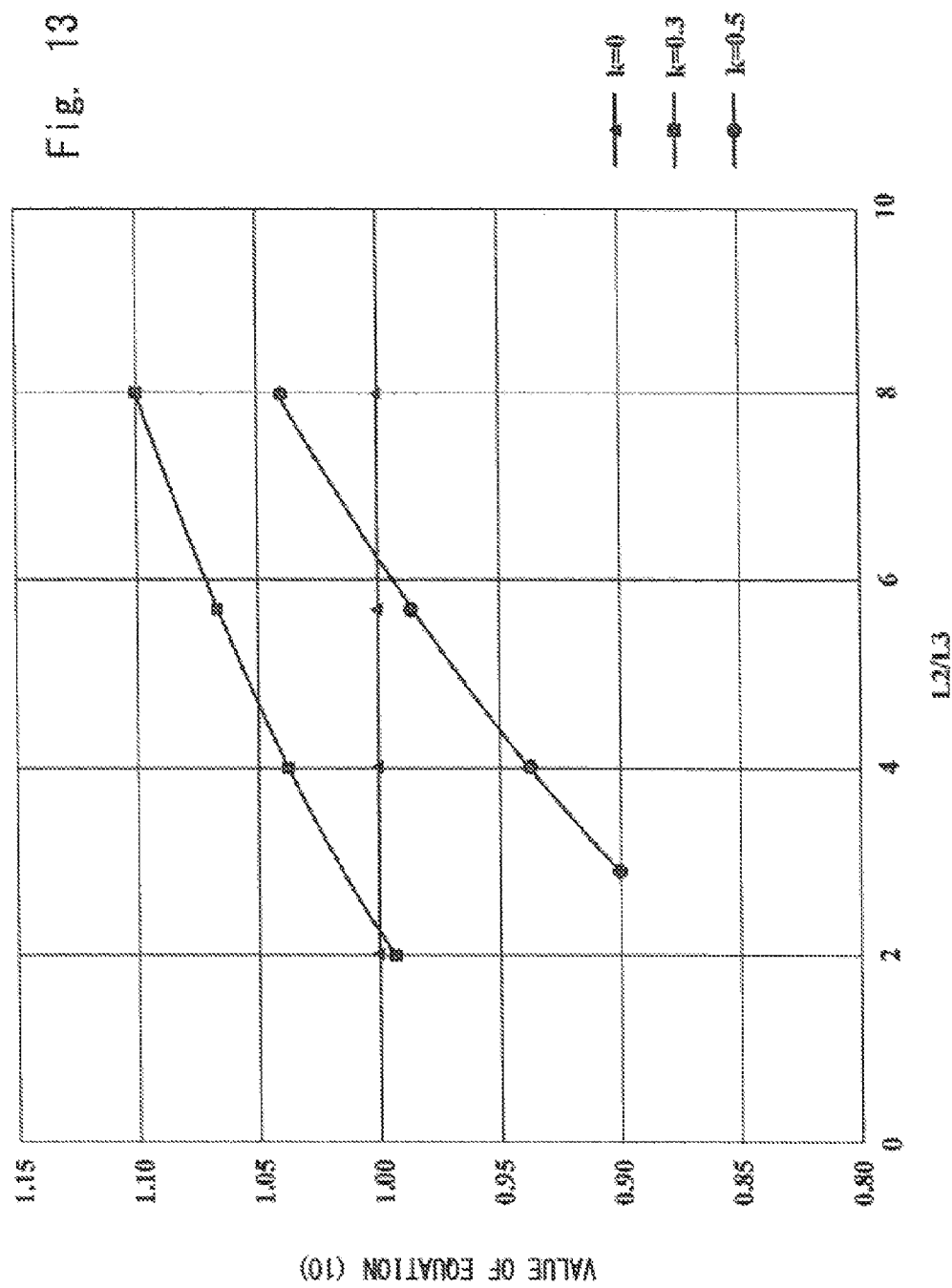
FIG. 13 is a view showing a relationship between a coupling constant and an inductance of the semiconductor device according to the first embodiment.

As one example, a result of plotting the value of Equation (10) where k12 is fixed to 0.8, k is a parameter, and (L2/L3) is a horizontal axis is shown in FIG. 13. FIG. 13 is a view showing a relationship between a coupling constant and an inductance of the semiconductor device according to the first embodiment. As shown in FIG. 13, the value of Equation (10) reaches its maximum at around k=0.3. In other words, the characteristic that a desired resonant operation can be obtained in the inductor L103 with smaller self inductance than the inductance of the inductor L47 of FIG. 4 is maximized at around k=0.3.

Figure 14:
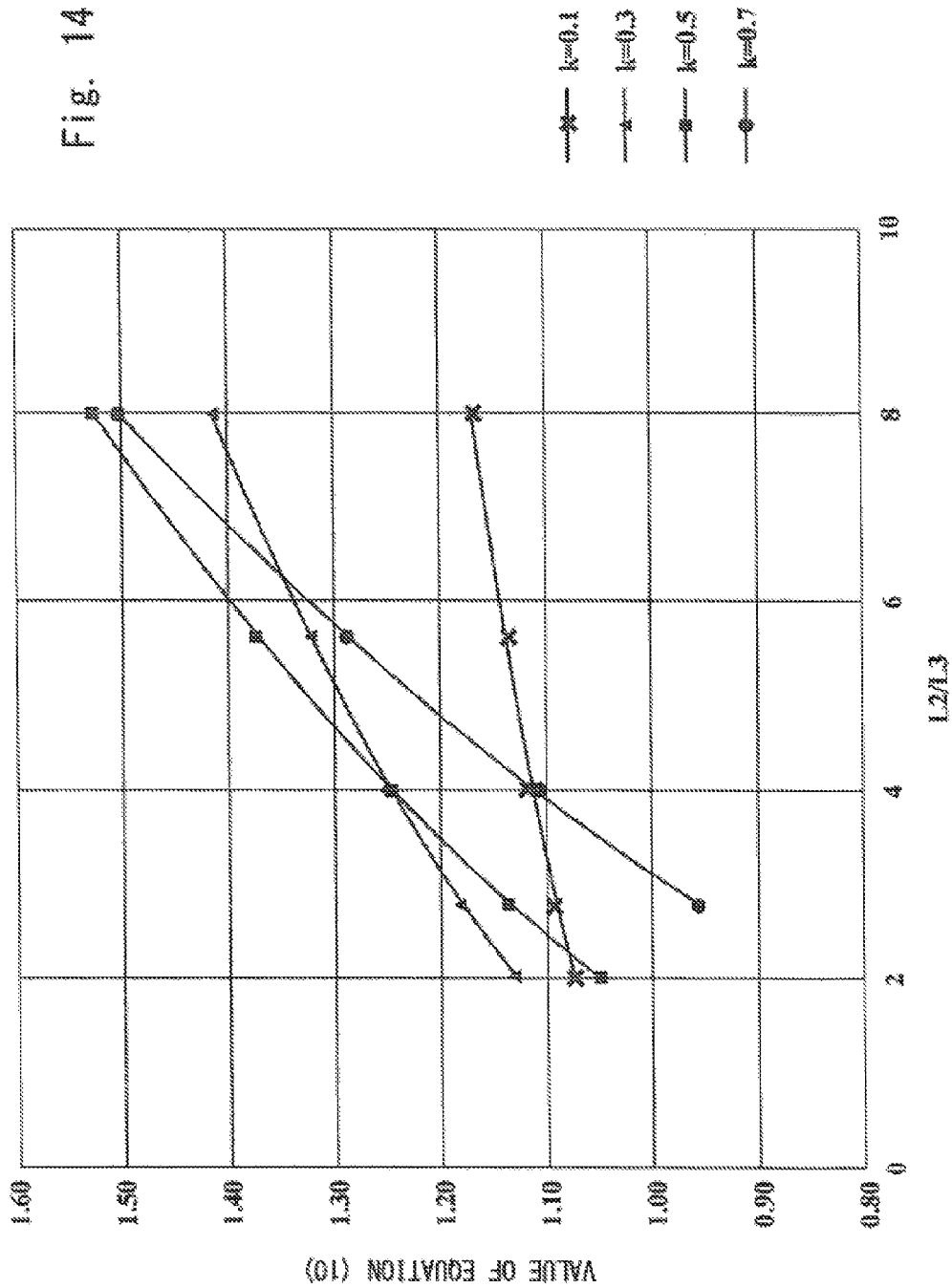
FIG. 14 is a view showing a relationship between a coupling constant and an inductance of the semiconductor device according to the first embodiment.

As another example, a result of the case where k12 is fixed to 0.6 is shown in FIG. 14. FIG. 14 is a view showing a relationship between a coupling constant and an inductance of the semiconductor device according to the first embodiment. As shown in FIG. 14, it reaches its optimum in the range of k=0.3 to k=0.5 in this case.

As described above, although the optimum value of k varies depending on the values of k12 and L2/L3, it is common that the better result can be obtained when the value of k is smaller than the value of k12 in any case.

This shows an important finding of this embodiment. It is more advantageous in terms of signal transmission to increase the coupling between the inductor L101 and the inductor L102, which function as the matching circuit. For this purpose, it is effective that the windings of the inductor L101 and the inductor L102 are merged and densely packed. Adding the winding of the inductor L103 of the filter to the dense region is not desirable for enhancing the coupling between the inductor L101 and the inductor L102 of the matching circuit.

Thus, it is preferred that the winding of the inductor L103 is placed outside the region where the windings of the inductor L101 and the inductor L102 are densely packed. The structure shown in FIG. 8 reflects this finding. In this structure, the coupling constant between the inductor L103 of the filter and the inductor L101 of the matching circuit is smaller than the coupling constant between the inductor L101 and the inductor L102 of the matching circuit. Likewise, the coupling constant between the inductor L103 of the filter and the inductor L102 of the matching circuit is smaller than the coupling constant between the inductor L101 and the inductor L102 of the matching circuit.

Therefore, in the structure shown in FIG. 8, a desired resonant operation can be obtained in the inductor L103 with smaller self inductance than the inductance of the inductor L47.

Further, as described above, in the structure shown in FIG. 8, the way of winding the inductor L102 of the matching circuit and the inductor L103 of the filter is in the same direction when viewed from the terminal P2P. When this direction is reversed, the value of k in Equation (10) is a negative value, and thereby the value of Equation (10) is smaller than 1. Thus, in order for the inductor L103 to obtain a desired resonant operation with smaller self inductance than the inductance of the inductor L47 of FIG. 4, the way of winding the inductor L102 of the matching circuit and the inductor L103 of the filter needs to be in the same circumferential direction, starting from the terminal P2P when viewed from the front of FIG. 8. The structure of the semiconductor device SD100 in FIG. 8 satisfies this condition.

As described above, in the semiconductor device according to the first embodiment, the inductor of the matching circuit and the inductor of the filter are wound substantially concentrically on the same plane, and it is thereby possible to reduce the footprints of the inductor of the matching circuit and the inductor of the filter. Further, because the inductor of the matching circuit and the inductor of the filter are coupled by mutual reactance, each of the inductors can achieve a required inductance with a small number of turns, and it is thereby possible to further reduce the footprints.

Further, in the semiconductor device according to the first embodiment, suppression of even-number order harmonics by balanced-to-unbalanced conversion and suppression of odd-number order harmonics by the inductor and the capacitor for the filter are integrated together, and it is thereby possible to reduce the footprints.

Figure 15:
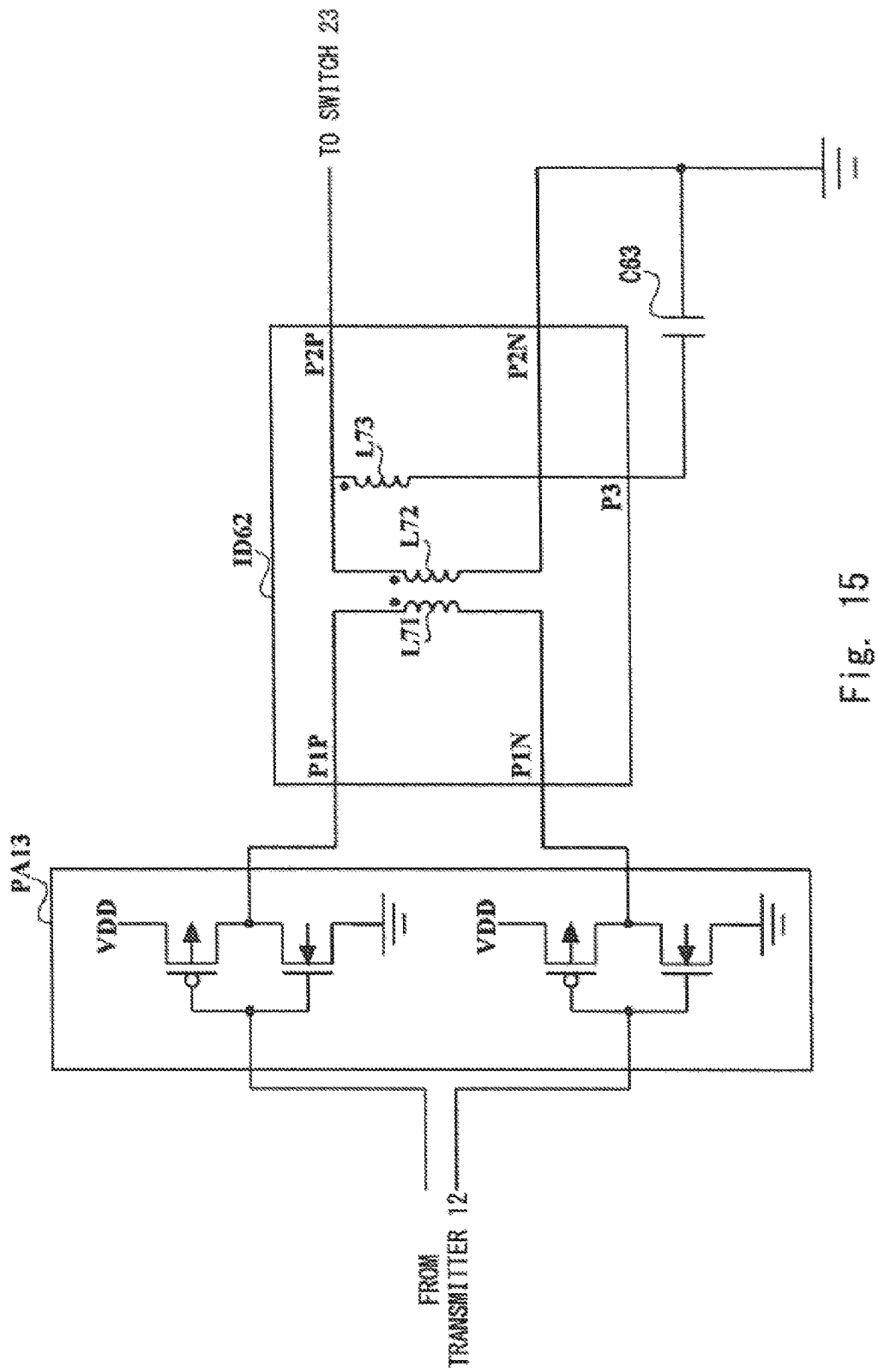
FIG. 15 is a view showing a schematic structure of the semiconductor device according to the first embodiment.

The semiconductor device of FIG. 8 can be incorporated into the semiconductor device of FIG. 5 and FIG. 6. FIG. 15 is a view showing a schematic structure of the semiconductor device according to the first embodiment. As shown in FIG. 1b, an amplifier PA13 is a differential power amplifier composed of a combination of FET. The amplifier PA13 has an input terminal connected to the transmitter 12 and an output terminal connected to a balanced terminal of a transmission matching circuit and inductor ID62.

The transmission matching circuit and inductor ID62 is composed of an inductor L71 on the balanced side, an inductor L72 on the unbalanced side, and an inductor L73 that forma a filter. The inductor L71 is connected to the output terminal of the amplifier PA13. One end of the inductor L72 is connected to the inductor L73 and a switch 23, and the other end of the inductor L72 is connected to a capacitor C63. One end of the capacitor C63 is connected to the inductor L73, and the other and of the capacitor C63 is grounded.

Comparing the semiconductor device of FIG. 15 with the semiconductor device of FIG. 3, because the transmission matching circuit and the inductor that forms the filter are integrated in the semiconductor device of FIG. 15, it is possible to reduce the circuit area compared with the semiconductor device of FIG. 3 in which those elements are placed separately.

Second Embodiment

Figure 16:
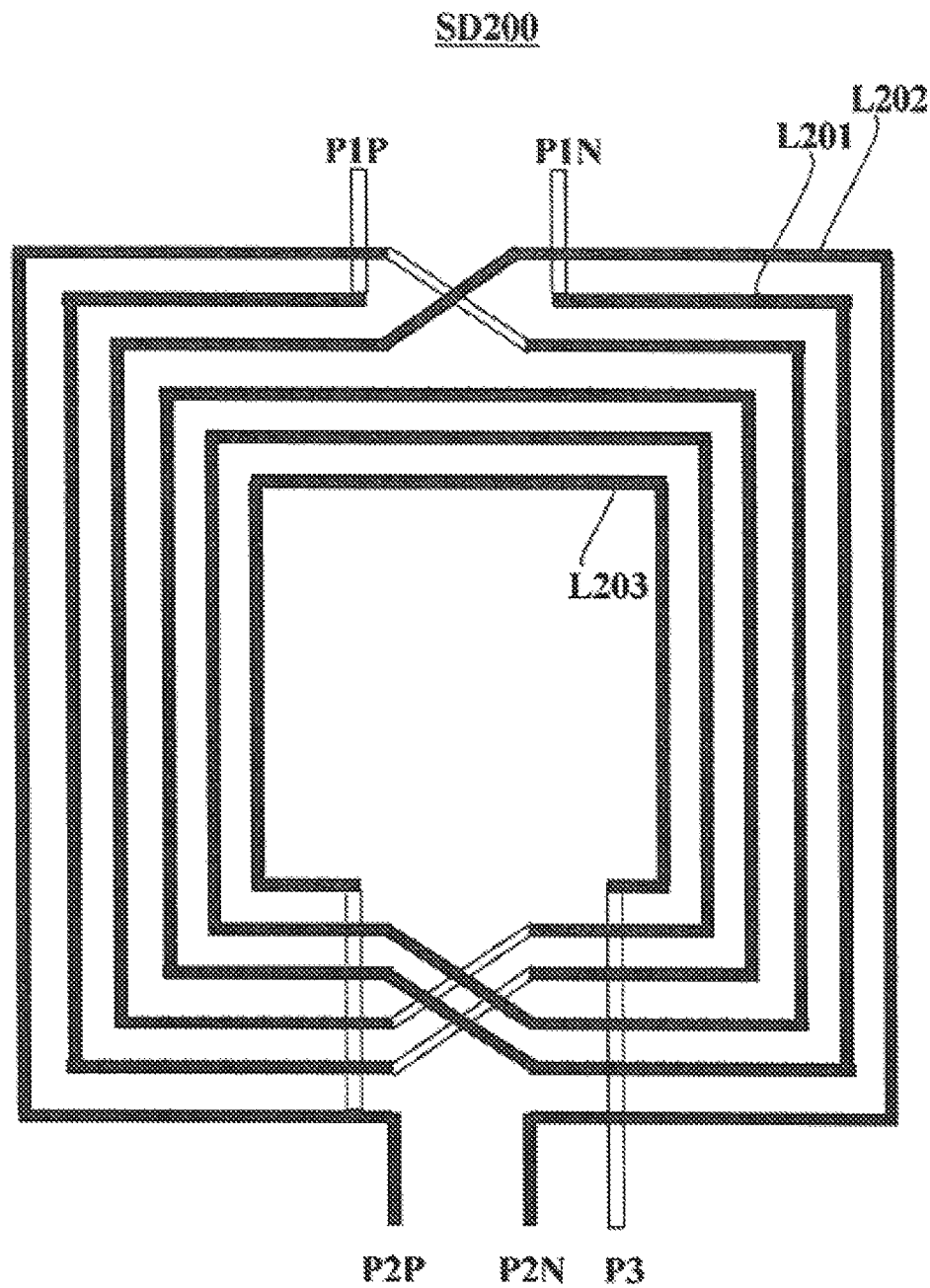
FIG. 16 is a view showing a structure of a semiconductor device according to a second embodiment.

FIG. 16 is a view showing a structure of a semiconductor device according to a second embodiment. In FIG. 16, the solid lines indicate wires of a wiring layer, and hollow lines indicate wires of another wiring layer. As shown in FIG. 16, a semiconductor device 200 has an inductor L201, an inductor L202 and an inductor L203 on a plane of a semiconductor substrate.

The inductor L201 is an inductor on the balanced side of the matching circuit and connects P1P and P1N as terminals. The inductor L202 is an inductor on the unbalanced side of the matching circuit and connects P2P and P2N as terminals.

The inductor L203 is an inductor that forms a filter and connects P2P and P3 as terminals. Thus, one ends of the inductor L202 and the inductor L203 are connected to each other, and they have P2P as an output terminal.

In FIG. 16, the inductor L201 has two turns, the inductor L202 has three turns, and the inductor L203 has one turn. However, the number of turns of each inductor is determined by inductance to be set, and it is not limited to the number of turns shown in FIG. 16.

Further, the inductor L202 and the inductor L203 are wound in the same circumferential direction when viewed from the terminal P2P, that is, wound right handed when FIG. 16 is viewed from the front. It is preferred that each inductor is formed on the thickest layer of the multi-layer wiring layer. Only at the intersection of wires, one wire is formed using another wiring layer.

As shown in FIG. 16, the inductor L201, the inductor L202 and the inductor L203 form a substantial loop and are arranged substantially concentrically on a plane with no contact with one another. In other words, the three inductors are arranged so that their centers are inside the innermost inductor.

Those inductors are arranged substantially concentrically: the inductor L203, the inductor L202, the inductor L201, the inductor L202, the inductor L201 and the inductor L202, sequentially from the inside.

Thus, in the semiconductor device 200, the inductor L203 for the filter is placed inside the inductors L201 and L202 for the matching circuit on the plane.

Third Embodiment

Figure 17:
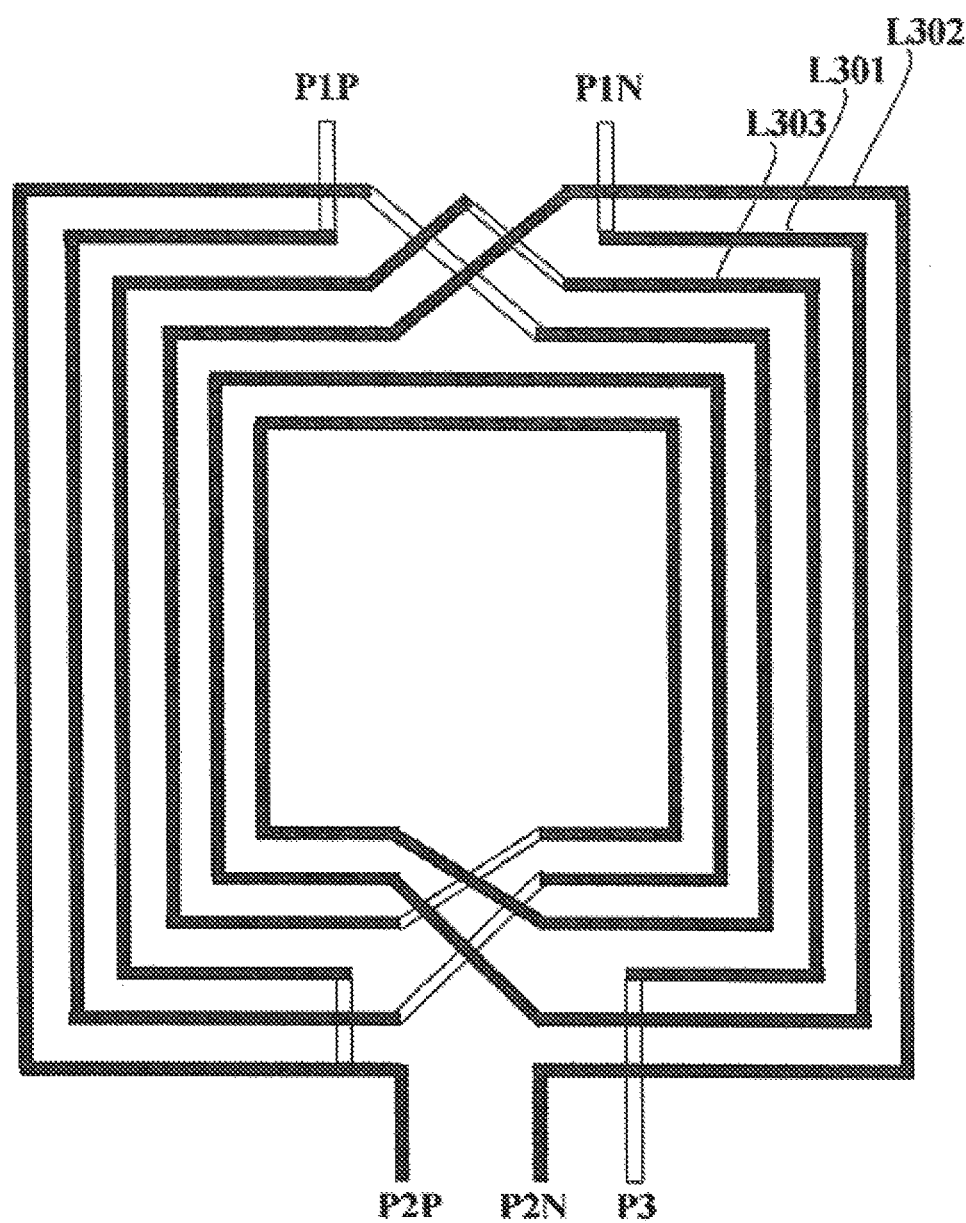
FIG. 17 is a view showing a structure of a semiconductor device according to a third embodiment.

FIG. 17 is a view showing a structure of a semiconductor device according to a third embodiment. In FIG. 17, the solid lines indicate wires of a wiring layer, and hollow lines indicate wires of another wiring layer. As shown in FIG. 17, a semiconductor device 300 has an inductor L301, an inductor L302 and an inductor L303 on a plane of a semiconductor substrate.

The inductor L301 is an inductor on the balanced side of the matching circuit and connects P1P and P1N as terminals. The inductor L302 is an inductor on the unbalanced side of the matching circuit and connects P2P and P2N as terminals.

The inductor L303 is an inductor that forms a filter and connects P2P and P3 as terminals. Thus, one ends of the inductor L302 and the inductor L303 are connected to each other, and they have P2P as an output terminal.

In FIG. 17, the inductor L301 has two turns, the inductor L302 has three turns, and the inductor L303 has one turn. However, the number of turns of each inductor is determined by inductance to be set, and it is not limited to the number of turns shown in FIG. 17.

Further, the inductor L302 and the Inductor L303 are wound in the same circumferential direction when viewed from the terminal P2P, that is, wound right handed when FIG. 17 is viewed from the front. It is preferred that each inductor is formed on the thickest layer of the multi-layer wiring layer. Only at the intersection of wires, one wire is formed using another wiring layer.

As shown in FIG. 17, the inductor L301, the inductor L302 and the inductor L303 form a substantial loop and are arranged substantially concentrically on a plane with no contact with one another. In other words, the three inductors are arranged so that their centers are inside the innermost inductor.

Those inductors are arranged substantially concentrically: the inductor L302, the inductor L301, the inductor L302, the inductor L303, the inductor L301 and the inductor L302, sequentially from the inside.

Thus, in the semiconductor device 300, the inductor L303 for the filter is placed between the inductors L301 and L302 for the matching circuit on the plane.

Fourth Embodiment

Figure 18:
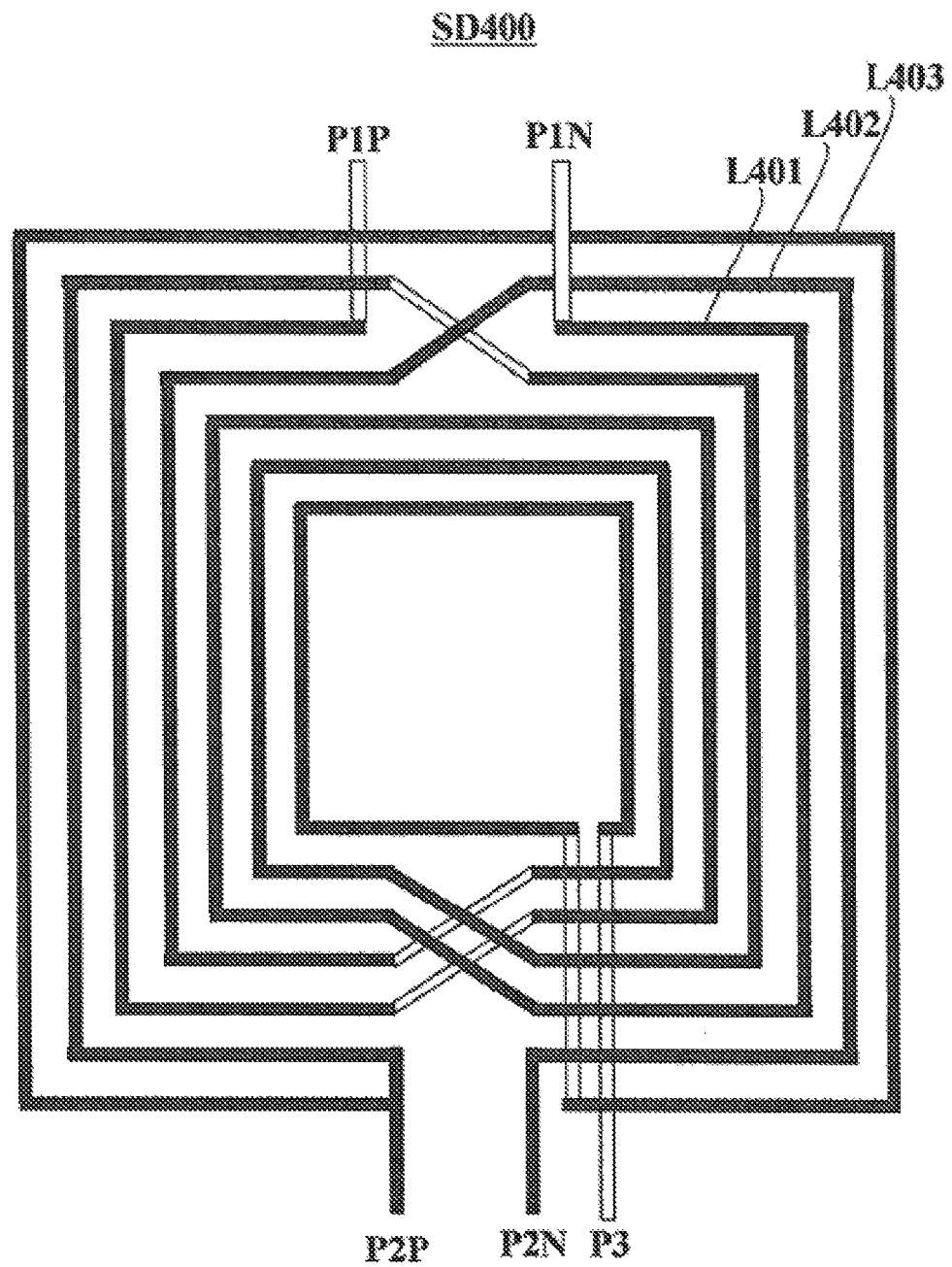
FIG. 18 is a view showing a structure of a semiconductor device according to a fourth embodiment.

FIG. 18 is a view showing a structure of a semiconductor device according to a fourth embodiment. In FIG. 18, the solid lines indicate wires of a wiring layer, and hollow lines indicate wires of another wiring layer. As shown in FIG. 18, a semiconductor device 400 has an inductor L401, an inductor L402 and an inductor L403 on a plane of a semiconductor substrate.

The inductor L401 is an inductor on the balanced side of the matching circuit and connects P1P and P1N as terminals. The inductor L402 is an inductor on the unbalanced side of the matching circuit and connects P2P and P2N as terminals.

The inductor L403 is an inductor that forms a filter and connects P2P and P3 as terminals. Thus, one ends of the inductor L402 and the inductor L403 are connected to each other, and they have P2P as an output terminal.

In FIG. 18, the inductor L401 has two turns, the inductor L402 has three turns, and the inductor L403 has two turns. However, the number of turns of each inductor is determined by inductance to be set, and it is not limited to the number of turns shown in FIG. 18.

Further, the inductor L402 and the inductor L403 are wound in the same circumferential direction when viewed from the terminal P2P, that is, wound right handed when FIG. 18 is viewed from the front. It is preferred that each inductor is formed on the thickest layer of the multi-layer wiring layer. Only at the intersection of wires, one wire is formed using another wiring layer.

As shown in FIG. 18, the inductor L401, the inductor L402 and the inductor L403 form a substantial loop and are arranged substantially concentrically on a plane with no contact with one another. In other words, the three inductors are arranged so that their centers are inside the innermost inductor.

Those inductors are arranged substantially concentrically: the inductor L403, the inductor L402, the inductor L401, the inductor L402, the inductor L401, the inductor L402 and the inductor L403, sequentially from the inside.

Thus, in the semiconductor device 400, the Inductor L403 for the filter is placed inside and outside the inductors L401 and L402 for the matching circuit on the plane.

Note that, although the inductor L403 has two turns in the fourth embodiment, the number of turns of the inductor L403 may be any value according to the capabilities required. Likewise, the number of turns of the inductor L403 on the outermost and innermost circumferences may be also any values according to the capabilities required.

Fifth Embodiment

Figure 19:
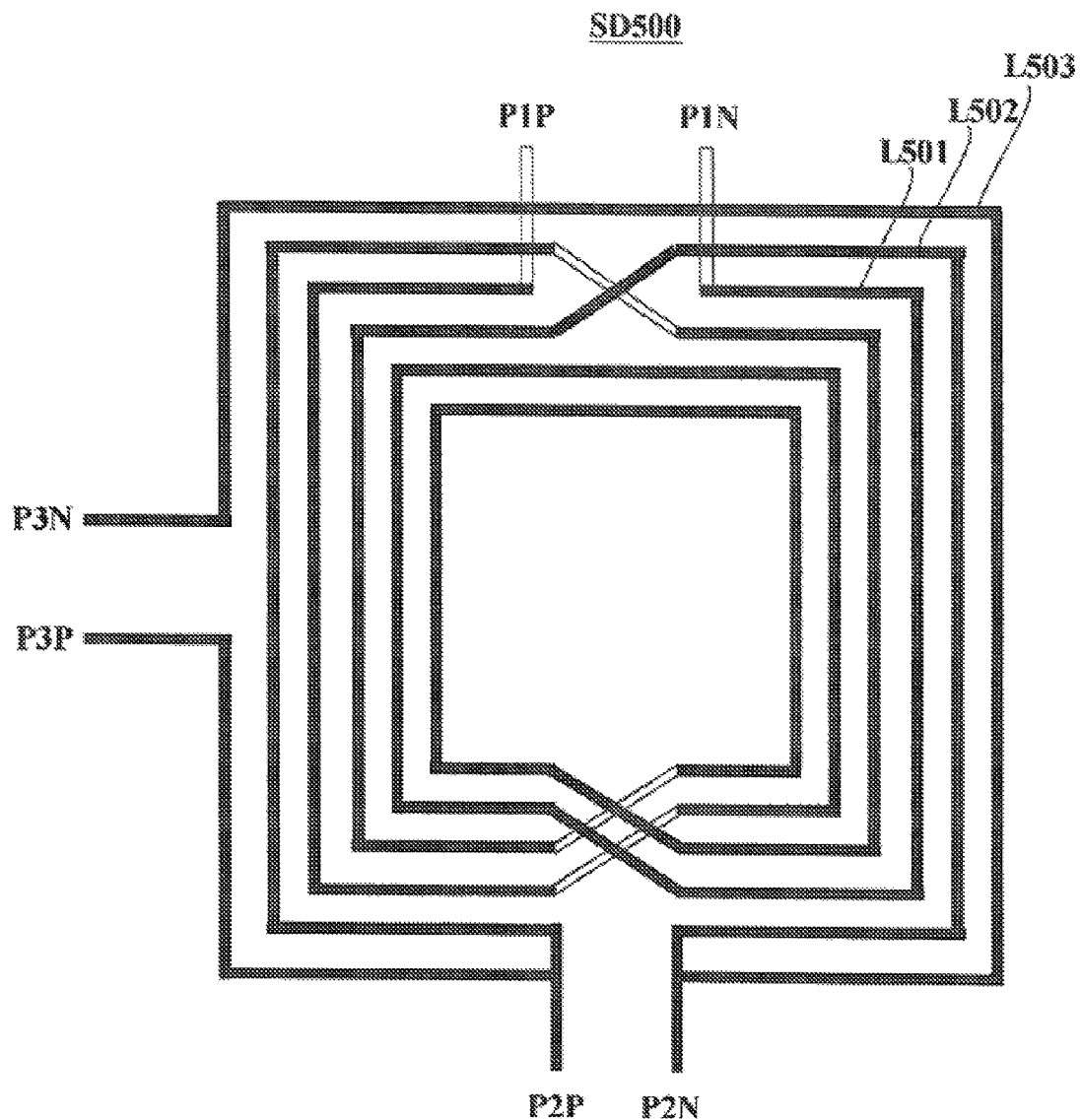
FIG. 19 is a view showing a structure of a semiconductor device according to a fifth embodiment.

FIG. 19 is a view showing a structure of a semiconductor device according to a fifth embodiment. In FIG. 19, the solid lines indicate wires of a wiring layer, and hollow lines indicate wires of another wiring layer. As shown in FIG. 19, a semiconductor device SD500 has an inductor L501, an inductor L502 and an inductor L503 on a plane of a semiconductor substrate.

The inductor L501 is an inductor on the balanced side of the matching circuit and connects P1P and P1N as terminals. The inductor L502 is an inductor on the unbalanced side of the matching circuit and connects P2P and P2N as terminals.

The inductor L503 is an inductor that forms a filter. To be specific, the inductor L503 is divided into a wire that connects P3P and P2P as terminals and a wire that connects P3N and P2N as terminals.

In FIG. 19, the inductor L501 has two turns, the inductor L502 has three turns, and the inductor L503 has one turn. However, the number of turns of each inductor is determined by inductance to be set, and it is not limited to the number at turns shown in FIG. 19.

Further, the inductor L502 and the inductor L503 are wound in the same circumferential direction when viewed from the terminal P2P, that is, wound right handed when FIG. 19 is viewed from the front. It is preferred that each inductor is formed on the thickest layer of the multi-layer wiring layer. Only at the intersection of wires, one wire is formed using another wiring layer.

As shown in FIG. 19, the inductor L501, the inductor L502 and the inductor L503 form a substantial loop and are arranged substantially concentrically on a plane with no contact with one another. In other words, the three inductors are arranged so that their centers are inside the innermost inductor.

Those inductors are arranged substantially concentrically: the inductor L502, the inductor L501, the inductor L502, the inductor L501, the inductor L502 and the inductor L503, sequentially from the inside.

In the semiconductor device SD500, the positions of the terminals of the inductors L501 and L502 for the matching circuit and the positions of the terminals of the inductor L503 for the filter are different.

Figure 20:
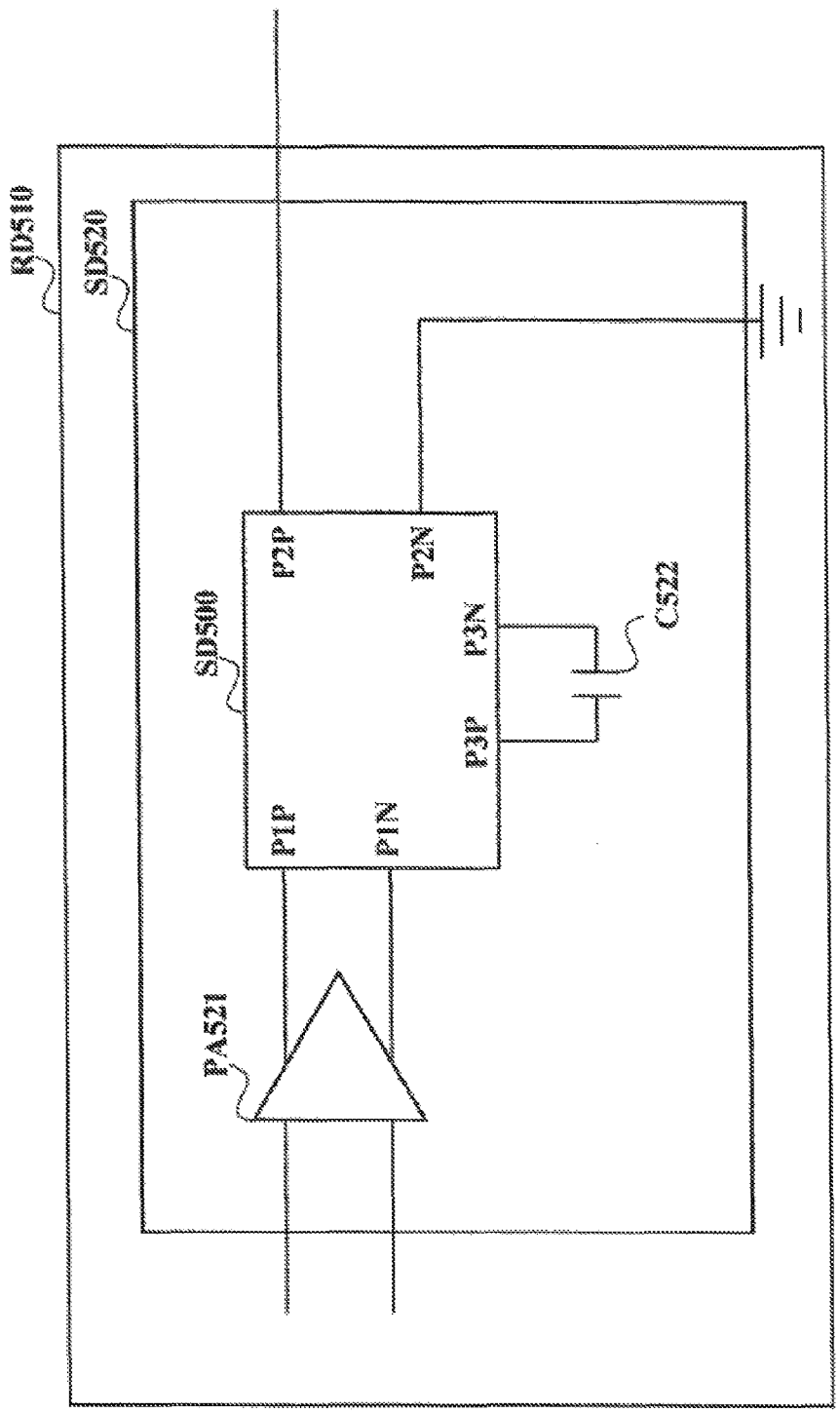
FIG. 20 is a view showing a structure of the semiconductor device according to the fifth embodiment.

FIG. 20 is a view showing a structure of the semiconductor device according to the fifth embodiment. As shown in FIG. 20, a semiconductor device SD520 inside a radio communication device RD510 includes an amplifier PA521, a semiconductor device SD500, and a capacitor C522.

As shown in FIG. 20, in the semiconductor device SD500, the terminals P1P and P1N are connected to the output of the amplifier PA521, the terminal P2P serves as the output terminal, the terminal P2N is grounded, and the terminal P3P and P3N are connected to the capacitor C522.

As described above, in the semiconductor device according to the fifth embodiment, the inductor for the filter is made up of two divided inductors, and each of the divided inductors connects the terminal of the secondary inductor and the terminal of the inductor for the filter, and it is thereby possible to determine the position of the terminal of the inductor for the filter in accordance with the placement position of the capacitor to be connected to the inductor for the filter, thus increasing the flexibility of wiring.

Sixth Embodiment

Figure 21:
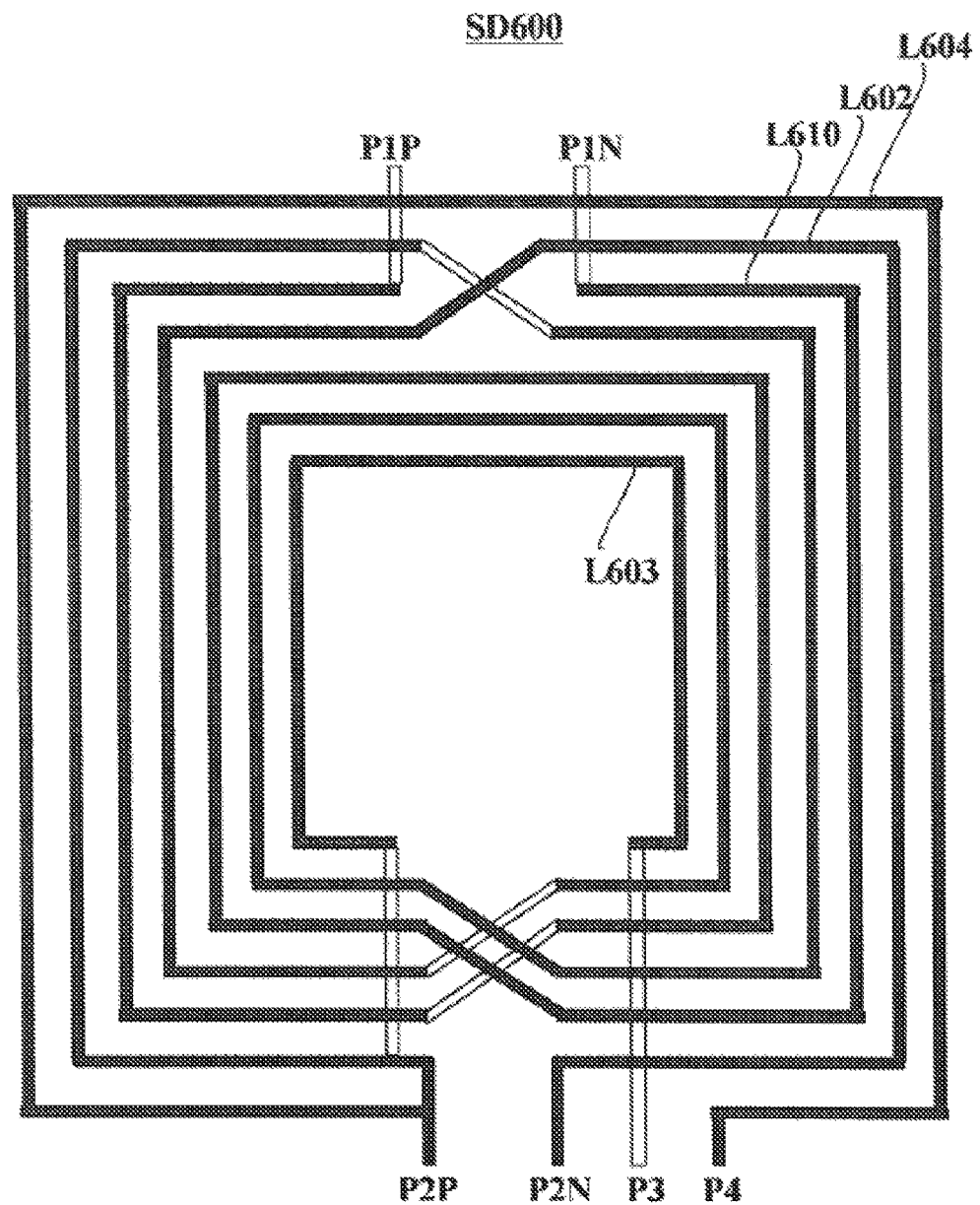
FIG. 21 is a view showing a structure of a semiconductor device according to a sixth embodiment.

FIG. 21 is a view showing a structure of a semiconductor device according to a sixth embodiment. In FIG. 21, the solid lines indicate wires of a wiring layer, and hollow lines indicate wires of another wiring layer. As shown in FIG. 21, a semiconductor device SD600 has an inductor L601, an inductor L602, an inductor L603, and an inductor L604 on a plane of a semiconductor substrate.

The inductor L601 is an inductor on the balanced side of the matching circuit and connects P1P and P1N as terminals. The inductor L602 is an inductor on the unbalanced side of the matching circuit and connects P2P and P2N as terminals.

The inductor L603 is an inductor that forms a filter and connects P2P and P3 as terminals. Thus, one ends of the inductor L602 and the inductor L603 are connected to each other, and they have P2P as an output terminal. The inductor L603 is placed inside the inductors L601 and L602.

The inductor L604 is an inductor that forms a filter and connects P2P and P4 as terminals. Thus, the inductor L603 and the inductor L604 are placed inside and outside the inductors L601 and L602.

Further, the inductor L602, the inductor L603 and the inductor L604 are wound in the same circumferential direction when viewed from the terminal P2P, that is, wound right handed when FIG. 21 is viewed from the front. It is preferred that each inductor is formed on the thickest layer of the multi-layer wiring layer. Only at the intersection of wires, one wire is formed using another wiring layer.

As shown in FIG. 21, the inductor L601, the inductor L602, the inductor L603 and the inductor L604 form a substantial loop and are arranged substantially concentrically on a plane with no contact with one another. In other words, the four inductors are arranged so that their centers are inside the innermost inductor.

Those inductors are arranged substantially concentrically: the inductor L603, the inductor L602, the inductor L601, the inductor L602, the inductor L601, the inductor L602 and the inductor L604, sequentially from the inside.

Thus, in the semiconductor device SD600, the inductor L603 for the filter is placed inside the inductors L601 and L602 for the matching circuit on the plane, and further the inductor L604 for the filter is placed outside the inductors L601 and L602 for the matching circuit on the plane.

Figure 22:
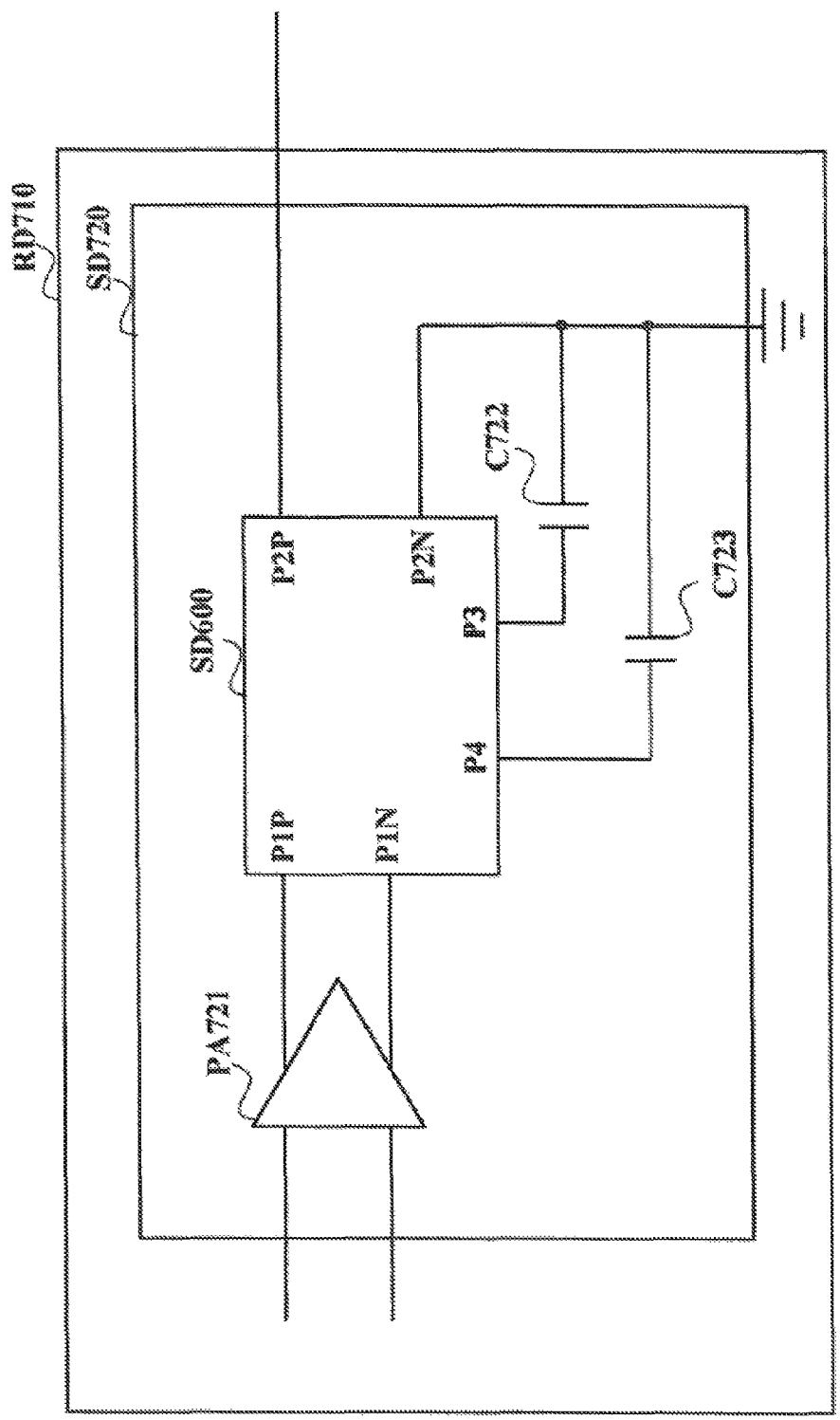
FIG. 22 is a view showing a structure of the semiconductor device according to the sixth embodiment.

FIG. 22 is a view showing a structure of the semiconductor device according to the sixth embodiment. As shown in FIG. 22, a semiconductor device SD720 inside a radio communication device SD710 includes an amplifier PA721, a semiconductor device SD600, a capacitor C722, and a capacitor C723.

As shown in FIG. 22, in the semiconductor device SD600, the terminals P1P and P1N are connected to the output of the amplifier PA721, the terminal P2P serves as the output terminal, the terminal P2N is grounded, and the terminal P2P and P3 are connected to the capacitor C722. Further, in the semiconductor device SD600, the terminal P2P and P4 are connected to the capacitor C723.

As described above, in the semiconductor device according to the sixth embodiment, a plurality of inductors for the filter are wound substantially concentrically on the same plane with the inductor for the matching circuit, and it is thereby possible to reduce the footprint of the circuit that suppresses a plurality of frequency bands.

For example, the inductor L603 and the capacitor C722 are in series resonance at a first frequency. The inductor L604 and the capacitor C723 are in series resonance at a second frequency. In this manner, the semiconductor device according to the sixth embodiment can obtain frequencies with two notches. If the two notches are set at a 2nd harmonic and a 5th harmonic, it is possible to suppress harmonics other than 7th or higher odd-number order harmonics.

Note that, although an example in which the semiconductor device includes two inductors for a filter is described in the sixth embodiment, the semiconductor device according to the sixth embodiment may include three or more inductors for a filter. For example, the semiconductor device according to the sixth embodiment may include a plurality of inductors for a filter inside or outside the inductor of a matching circuit. Further, in the semiconductor device according to the sixth embodiment, one or a plurality of inductors for a filter may be placed between a plurality of inductors of a matching circuit, and a plurality of other inductors for a filter may be placed inside or outside the inductors of the matching circuit as shown in FIG. 17.

Seventh Embodiment

Figure 23:
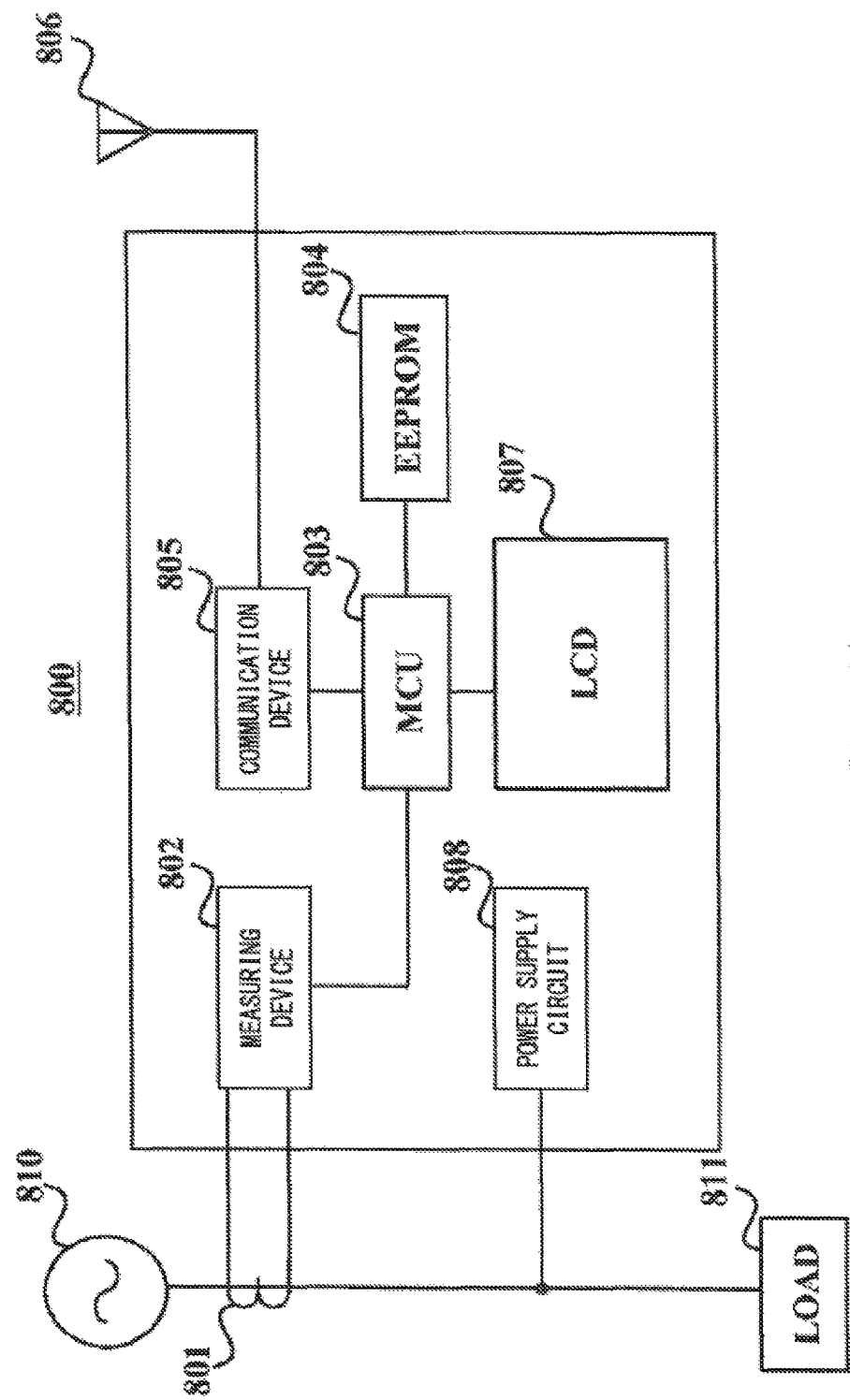
FIG. 23 is a view showing a structure of radio communication of a device according to a seventh embodiment.

FIG. 23 is a view showing a structure of radio communication of a device according to a seventh embodiment. In FIG. 23, a radio communication device 800 includes an ammeter 801, a measuring device 802, an MCU 803, an EEPROM 804, a communication device 805, an antenna 806, an LCD 807, and a power supply circuit 808.

The ammeter 801 detects a current that flows from a commercial power supply 810 to a household power supply 811. The measuring device 802 outputs a measured value of the current detected by the ammeter 801 to the MCU 803.

The MCU 803 is a micro control unit. The MCU 803 integrates the measured values of the current measured by the measuring device 802 and outputs data of the integrated current value to the communication device 805. The EEPROM 803 is an electrically erasable programmable read-only memory. The EEPROM 804 stores a program required for the operation of the MCU.

The communication device 805 converts the data output from the MCU 803 into a radio signal and transmits it from the antenna 806. The communication device 805 includes the semiconductor device according to any one of the first to sixth embodiments. The communication device 805 reduces harmonics after amplification of the radio signal by using the semiconductor device according to any one of the first to sixth embodiments.

The LCD 807 is a liquid crystal display. For example, the LCD 807 displays the measured value of the current measured by the measuring device 802. The power supply circuit 808 supplies the power obtained from the commercial power supply to each element of the radio communication device 800.

As described above, according to the device of the seventh embodiment, by applying the semiconductor device in which the inductor of the matching circuit and the inductor of the filter are wound substantially concentrically on the same plane to the radio communication device, it is possible to reduce the area of the semiconductor device and thereby reduce the size of the radio communication device.

Note that, as one example of the measuring device, a power meter, a water meter, a gas meter, a weather meter (the amount of rainfall, temperature, humidity etc.) and the like may be used.

As another example of the measuring device, when performing communication between a heart rate meter, a blood pressure meter or a pedometer used in the fitness and health care fields and computer equipment such as a smart phone by radio signals, it can be incorporated into each device.

Further, as the radio communication device, it is suitable to apply to BLE (Bluetooth (registered trademark) Low Energy).

Further, it is also applicable to a device that records the details of driving on bicycle. For example, when performing communication between a sensor mounted on a wheel and a handle of a bicycle and a recording computer mounted on the handle by radio signals, it can be incorporated into each device.

Further, when adjusting time or performing communication between a clock with incoming email notification function and an NTP server, an email server or a computer terminal that receives emails by radio signals, it can be incorporated into each device.

Further, when performing communication between devices such as a key less entry device and iBeacon (registered trademark) by radio signals, it can be incorporated into each device. Further, it can be also incorporated into a wearable device.

Note that the shape of each inductor on the plane may be any shape as long as it can turn between terminals one or a plurality of times. The shape of each inductor may be a polygon such as a hexagon or an octagon, a circle, an oval or a shape made up of a composite curve, for example.

Further, the number of turns of each inductor can be arbitrarily determined according to the capabilities required.

A part where the wires of the inductors intersect with each other is not particularly limited, and it may be any place that forms the circumference.

The way each inductor is wound on the plane may be in spiral, for example.

It is defined that the inductors are substantially concentric if the center or the barycenter of each inductor is inside the innermost inductor.

The direction of winding each inductor may be right handed or left handed.

Further, although the primary inductor of the matching circuit is an inductor on the balanced side and the secondary inductor of the matching circuit is an inductor on the unbalanced side in the examples of the above-described embodiments, the primary inductor may be an inductor on the unbalanced side, and the secondary inductor may be an inductor on the balanced side. In this case, one end of the inductor on the unbalanced side, which is the primary inductor, is grounded.

Further, although the output is a single phase in the examples of the above-described embodiments, a differential output configuration in which the terminal P2P is one output terminal and a connection node between the terminal P2N and the capacitor is the other output terminal may be employed. In other words, it is applicable as the function of impedance matching and filter in a balanced signal.

In the case where there are a plurality of wiring layers having a sufficient thickness to achieve the required inductance characteristic, each inductance may be formed by using them in an arbitrary manner. Further, by connecting a plurality of wiring layers in parallel, one or a plurality of inductances may be formed.

The power amplifier and the output circuit that includes the matching circuit according to each of the above-described embodiments may be integrated into one semiconductor substrate or formed on different semiconductor substrates. In the latter case, different semiconductor processes may be used in the semiconductor substrate in which the power amplifier is formed and the semiconductor substrate in which the output circuit that includes the matching circuit according to each embodiment is formed. It is thereby possible to manufacture them by the process with the lowest cost having the characteristics required for each. Those two semiconductor substrates may be mounted in one package, mounted in different packages and then built into module, or mounted in a module as a bare die.

Further, in the semiconductor device according to the above embodiment, the conductivity type (P type or N type) of a semiconductor substrate, a semiconductor layer, a diffusion layer (diffusion region) and the like may be inverted. Accordingly, when one conductivity type of N type and P type is a first conductivity type and the other conductivity type thereof is a second conductivity type, the first conductivity type may be P type and the second conductivity type may be a type, or the first conductivity type may be N type and the second conductivity type may be P type on the contrary.

Although embodiments of the present invention are described specifically in the foregoing, the present invention is not restricted to the above-described embodiments, and various changes and modifications may be made without departing from the scope of the invention.

The first to seventh embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that. Applicant's intent is to encompass equivalents of all claim elements, even if amended later during prosecution.

What is claimed is:

1. A semiconductor device comprising:
   a transmitting circuit that converts transmission data into a transmission signal with a specified frequency;
   an amplifier that amplifies a power of the transmission signal;
   a matching circuit that converts the transmission signal from a balanced signal to an unbalanced signal; and
   a filter circuit that restricts a frequency band of the transmission signal, wherein
   the matching circuit includes a primary inductor and a secondary inductor,
   the filter circuit includes an inductor, and
   the primary inductor, the secondary inductor and the inductor for the filter are wound substantially concentrically on one plane.

2. The semiconductor device according to claim 1, wherein a coupling constant between the inductor for the filter and the primary inductor is smaller than a coupling constant between the primary inductor and the secondary inductor, and a coupling constant between the inductor for the filter and the secondary inductor is smaller than a coupling constant between the primary inductor and the secondary inductor.

3. The semiconductor device according to claim 1, wherein
   the primary inductor is an inductor on a balanced side, and the secondary inductor is an inductor on an unbalanced side,
   one end of the inductor on the unbalanced side is grounded, and
   the matching circuit performs balanced-to-unbalanced conversion.

4. The semiconductor device according to claim 1, wherein the inductor for the filter and the secondary inductor are wound in the same circumferential direction from a connection point between the inductor for the filter and the secondary inductor on the plane.

5. The semiconductor device according to claim 1, wherein the inductor for the filter is placed outside the matching circuit.

6. The semiconductor device according to claim 1, wherein the inductor for the filter is placed inside the matching circuit.

7. The semiconductor device according to claim 1, wherein the inductor for the filter is placed between the primary inductor and the secondary inductor.

8. The semiconductor device according to claim 1, wherein the inductor for the filter is placed inside and outside the matching circuit.

9. The semiconductor device according to claim 1, wherein one terminal of the secondary inductor and one terminal of the inductor for the filter are connected, and the secondary inductor and the inductor for the filter have a common terminal.

10. The semiconductor device according to claim 1, wherein the inductor for the filter is made up of two divided inductors, and each of the divided inductors connects a terminal of the secondary inductor and a terminal of the inductor for the filter.

11. The semiconductor device according to claim 1, wherein the inductor for the filter includes an inductor placed outside the matching circuit and an inductor placed inside the matching circuit separately from each other.

12. The semiconductor device according to claim 1, further comprising:
    a capacitor that is connected to one end of the secondary inductor and one end of the inductor for the filter.

13. The semiconductor device according to claim 1, wherein
    the amplifier amplifies an alternating signal, and
    an output terminal of the amplifier and the primary inductor are connected.

14. The semiconductor device according to claim 1, wherein
    the amplifier amplifies a signal with a radio frequency, and
    the matching circuit connects the primary inductor to the amplifier.

* * * * *